United States Patent
Inoue

(10) Patent No.: US 11,994,263 B2
(45) Date of Patent: May 28, 2024

(54) SENSOR SYSTEM ADAPTED TO BE INSTALLED IN A VEHICLE INCLUDING A COVER

(71) Applicant: KOITO MANUFACTURING CO., LTD., Tokyo (JP)

(72) Inventor: Hiroshi Inoue, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 451 days.

(21) Appl. No.: 17/292,889

(22) PCT Filed: Nov. 12, 2019

(86) PCT No.: PCT/JP2019/044330
§ 371 (c)(1),
(2) Date: May 11, 2021

(87) PCT Pub. No.: WO2020/100892
PCT Pub. Date: May 22, 2020

(65) Prior Publication Data
US 2021/0402960 A1 Dec. 30, 2021

(30) Foreign Application Priority Data

Nov. 13, 2018 (JP) .................. 2018-213126
Nov. 13, 2018 (JP) .................. 2018-213127
Mar. 15, 2019 (JP) .................. 2019-048514

(51) Int. Cl.
*F21S 41/20* (2018.01)
*B60S 1/52* (2006.01)
(Continued)

(52) U.S. Cl.
CPC ............... *F21S 41/28* (2018.01); *B60S 1/52* (2013.01); *B60W 40/02* (2013.01); *G01S 7/4813* (2013.01);
(Continued)

(58) Field of Classification Search
CPC ........... B60S 1/0859; B60S 1/56; F21S 41/28; G01S 7/4813; G01S 7/497; G01S 17/931;
(Continued)

(56) References Cited

U.S. PATENT DOCUMENTS

2007/0115357 A1 5/2007 Stein et al.
2011/0073142 A1 3/2011 Hattori et al.
(Continued)

FOREIGN PATENT DOCUMENTS

DE          44 35 941 A1    4/1995
DE    10 2017 109 138 A1   10/2018
(Continued)

OTHER PUBLICATIONS

International Search Report (PCT/ISA/210) dated Jan. 7, 2020, issued by the International Searching Authority in counterpart International Application No. PCT/JP2019/044330.
(Continued)

*Primary Examiner* — Michael A Lyons
(74) *Attorney, Agent, or Firm* — Sughrue Mion, PLLC

(57) ABSTRACT

A LiDAR sensor unit is configured to detect information of an outside area of a vehicle with sensing light. A cover covers the LiDAR sensor unit so as to allow passage of the sensing light while forming a part of an outer surface of the vehicle. A strain gage is disposed on the cover and configured to output a strain signal corresponding to strain generated in the cover. A processor is configured to detect a foreign substance adhered to the cover based on the strain signal.

11 Claims, 15 Drawing Sheets

(51) Int. Cl.
*B60W 40/02* (2006.01)
*G01S 7/481* (2006.01)
*G01S 7/497* (2006.01)
*G01S 17/931* (2020.01)

(52) U.S. Cl.
CPC ............ *G01S 7/497* (2013.01); *G01S 17/931* (2020.01); *B60W 2420/408* (2024.01); *G01S 2007/4977* (2013.01)

(58) Field of Classification Search
CPC ..... G01S 2007/4975; G01S 2007/4977; B60Q 1/0023
See application file for complete search history.

(56) References Cited

U.S. PATENT DOCUMENTS

| | | |
|---|---|---|
| 2015/0293532 A1 | 10/2015 | Gilliland et al. |
| 2018/0284268 A1* | 10/2018 | McWhirter ............. G01S 17/42 |
| 2019/0383912 A1* | 12/2019 | Kim ........................ G01S 17/42 |
| 2020/0096622 A1 | 3/2020 | Busse et al. |
| 2020/0142187 A1* | 5/2020 | Hu ........................ H04N 23/61 |

FOREIGN PATENT DOCUMENTS

| | | |
|---|---|---|
| JP | 3-28269 Y2 | 6/1991 |
| JP | 2007-106199 A | 4/2007 |
| JP | 2018-48896 A | 3/2018 |
| WO | 2012/061376 A2 | 5/2012 |

OTHER PUBLICATIONS

Written Opinion (PCT/ISA/237) dated Jan. 7, 2020, issued by the International Searching Authority in counterpart International Application No. PCT/JP2019/044330.

Communication dated Nov. 22, 2021 issued by the European Intellectual Property Office in counterpart European Application No. 19884423.5.

* cited by examiner

SENSOR SYSTEM ADAPTED TO BE INSTALLED IN A VEHICLE INCLUDING A COVER

CROSS-REFERENCE TO RELATED APPLICATIONS

This application is a National Phase Entry of PCT International Application No. PCT/JP2019/044330, filed on Nov. 12, 2019, which claims priority to Japanese Patent Application No. 2018-213126 filed on Nov. 13, 2018, Japanese Patent Application No. 2018-213127 filed on Nov. 13, 2018, and Japanese Patent Application No. 2019-048514 filed on Mar. 15, 2019, the contents of all of which are incorporated herein by reference in their entirety.

FIELD

The presently disclosed subject matter relates to a sensor system adapted to be installed in a vehicle.

BACKGROUND

In order to perform driving support of the vehicle, a sensor unit for detecting information of an outside area of the vehicle is mounted on the vehicle body. Patent Document 1 discloses a radar as such a sensor unit. The radar is disposed in a lamp chamber of a lamp device for illuminating the outside area of the vehicle. That is, the radar is covered with a cover that defines the lamp chamber and allows passage of the illumination light. The cover forms a part of an outer surface of the vehicle, and allows passage of the sensing light for the radar to detect information of the outside area.

As used herein, the term "driving support" means control processing that at least partially performs at least one of driving operation (steering operation, acceleration, deceleration, etc.), monitoring of a driving environment, and backup of driving operation. That is, the term "driving support" means not only the partial driving support such as braking function for collision avoidance and assisting function for lane-keeping, but also a full self-driving operation.

CITATION LIST

Patent Document

Patent Document 1: Japanese Patent Publication No. 2007-106199 A

SUMMARY

Technical Problem

It is demanded to suppress degradation in the information detecting capability of the sensor unit covered by the cover forming a part of the outer surface of the vehicle.

Solution to Problem

In order to meet the demand described above, a first illustrative aspect of the presently disclosed subject matter provides a sensor system adapted to be installed in a vehicle, comprising:
 a sensor unit configured to detect information of an outside area of the vehicle with light;
 a cover covering the sensor unit so as to allow passage of the light while forming a part of an outer surface of the vehicle;
 a displacement sensor disposed on the cover and configured to output a signal corresponding to displacement of the cover; and
 a processor configured to detect a foreign substance adhered to the cover based on a change in the signal.

The distribution of the strain generated in the cover is not uniform, but the modes of strain detected at the same location exhibit the same displacement tendency. Accordingly, the detected results repeatedly obtained by the same displacement sensor exhibit the same tendency. However, the adhesion of foreign substance to the cover causes a change in the distribution of the strain of the cover. Accordingly, the result detected by the same displacement sensor also changes. That is, it is possible to detect the foreign substance adhering to the cover by monitoring the change in the result detected by the displacement sensor.

If a foreign substance adheres to a portion of the cover located on the traveling path of the light used by the sensor unit for detecting information, the sensor unit may be obstructed from detecting the information of the outside area of the vehicle. However, since the adhesion of such a foreign substance is detected by the displacement sensor configured as described above, it is possible to perform appropriate treatment according to the detected result. Accordingly, it is possible to suppress degradation in the information detecting capability by the sensor unit covered by the cover forming a part of the outer surface of the vehicle.

As the displacement sensor, for example, at least one of a strain gauge, an acceleration sensor, and an optical fiber sensor may be used.

In particular, in a case where the optical fiber sensor is used as the displacement sensor, it is possible to arrange the optical fiber sensor on the cover with higher degree of freedom because the optical fiber is light and flexible. In addition, since the optical fiber is very thin, even if it is disposed on the surface of the cover, the appearance or the design of the cover is less influenced. In addition, a plurality of strain sensing points can be set in a single optical fiber. Accordingly, it is possible to enhance the degree of freedom in designing the sensor system for suppressing the degradation of the information detecting capability of the sensor unit.

In particular, in a case where an acceleration sensor is used as the displacement sensor, the sensor system may include an actuator for vibrating the cover.

According to such a configuration, by actively vibrating the cover, it is possible to make the change of the vibration mode detected by the acceleration sensor more remarkable. Accordingly, the influence of noise can be suppressed, so that the detection accuracy of the foreign substance requiring removal can be enhanced. Accordingly, the effect of suppressing degradation in the information detecting capability by the sensor unit covered by the cover forming a part of the outer surface of the vehicle is further enhanced.

The sensor system according to the first illustrative aspect may be configured such that the displacement sensor is disposed in an peripheral portion of the cover.

The peripheral portion of the cover is likely to cause a significant change in the rigidity or flexibility of the cover. In such a position, strain is likely to occur. Accordingly, by disposing the displacement sensor at the peripheral portion of the cover, it is possible to enhance the detection sensitivity of the strain. Accordingly, the effect of suppressing degradation in the information detecting capability by the sensor unit covered by the cover forming a part of the outer surface of the vehicle is further enhanced.

The sensor system according to the first illustrative aspect may be configured such that the displacement sensor is disposed in a portion where a thickness of the cover changes.

The portion where the thickness of the cover changes is likely to cause a significant change in the rigidity or flexibility of the cover. In such a position, strain is likely to occur. Accordingly, by disposing the displacement sensor in such a portion, it is possible to enhance the detection sensitivity of the strain. Accordingly, the effect of suppressing degradation in the information detecting capability by the sensor unit covered by the cover forming a part of the outer surface of the vehicle is further enhanced.

The sensor system according to the first illustrative aspect may be configured so as to further comprise a nozzle configured to spray liquid, and such that the processor is configured to cause the nozzle to spray the liquid toward the cover in a case where adhesion of the foreign substance is detected.

According to such a configuration, it is possible to automate the treatment for removing the foreign substance adhering to the cover. Accordingly, the effect of suppressing degradation in the information detecting capability by the sensor unit covered by the cover forming a part of the outer surface of the vehicle is enhanced.

The sensor system according to the first illustrative aspect may be configured so as to further comprise a nozzle configured to spray liquid, and such that the processor is configured to specify a position in the cover to which the foreign substance adheres, and to cause the nozzle to spray the liquid toward the position.

According to such a configuration, since the liquid is more accurately sprayed onto the foreign substance adhering to the light passage area, it is possible to increase the possibility of removing the foreign substance. Accordingly, the effect of suppressing degradation in the information detecting capability by the sensor unit covered by the cover forming a part of the outer surface of the vehicle is further enhanced.

In order to meet the demand described above, a second illustrative aspect of the presently disclosed subject matter provides a sensor system adapted to be installed in a vehicle, comprising:
  a sensor unit configured to detect information of an outside area of the vehicle with light;
  a cover covering the sensor unit so as to allow passage of the light while forming a part of an outer surface of the vehicle; and
  an actuator disposed on the cover and configured to vibrate the cover.

If a foreign substance adheres to a portion of the cover located on the traveling path of the light used by the sensor unit for detecting information, the sensor unit may be obstructed from detecting the information of the outside area of the vehicle. However, according to the configuration as described above, it is possible to promote the separation or removal of the adhered foreign substance by the vibration of the cover itself excited by the ultrasonic actuator. Accordingly, it is possible to suppress degradation in the information detecting capability by the sensor unit covered by the cover forming a part of the outer surface of the vehicle.

The sensor system according to the second illustrative aspect may be configured so as to further comprise a nozzle configured to spray liquid toward the cover.

According to such a configuration, a so-called ultrasonic cleaning effect by the liquid sprayed from the nozzle can be obtained, so that separation or removal of the foreign substance adhering to the cover can be further promoted.

The sensor system according to each of the first and second illustrative aspects may be configured so as to further comprise a lamp unit configured to emit illumination light to the outside area of the vehicle, and such that the cover is configured to allow passage of the illumination light.

Because of the function of supplying illumination light to the outside area of the vehicle, the lamp unit is generally disposed in a place in the vehicle where there are few obstructions. By disposing also the sensor unit in such a place, it is possible to efficiently obtain information of the outside area of the vehicle.

In order to meet the demand described above, a third illustrative aspect of the presently disclosed subject matter provides a sensor system adapted to be installed in a vehicle, comprising:
  a sensor unit configured to detect information of an outside area of the vehicle with light;
  a cover covering the sensor unit so as to allow passage of the light while forming a part of an outer surface of the vehicle;
  a camera configured to output a signal corresponding to an image of a light passage area of the cover through which the light passes; and
  a processor configured to detect a foreign substance adhered to the light passage area based on the signal,
  wherein at least a portion of a focal plane of the camera overlaps the light passage area.

In order to meet the demand described above, a fourth illustrative aspect of the presently disclosed subject matter provides a sensor system adapted to be installed in a vehicle, comprising:
  a sensor unit configured to detect information of an outside area of the vehicle with light;
  a cover covering the sensor unit so as to allow passage of the light while forming a part of an outer surface of the vehicle;
  a camera configured to output a signal corresponding to an image of a light passage area of the cover through which the light passes; and
  a processor configured to detect a foreign substance adhered to the light passage area based on the signal,
  wherein an optical axis of the camera extends in a different direction from a reference sensing direction of the sensor unit.

In order to meet the demand described above, a fifth illustrative aspect of the presently disclosed subject matter provides a sensor system adapted to be installed in a vehicle, comprising:
  a LiDAR sensor unit configured to detect information of an outside area of the vehicle with sensing light;
  a cover covering the LiDAR sensor unit so as to allow passage of the sensing light while forming a part of an outer surface of the vehicle;
  a camera configured to output a signal corresponding to an image of a light passage area of the cover through which the sensing light passes; and
  a processor configured to detect a foreign substance adhered to the light passage area based on the signal.

The camera according to each of the third to fifth illustrative aspects is not a device for acquiring an image of the outside area of the vehicle (strictly speaking, an image of an area outer than the outer face of the cover) but is a device for acquiring an image of the light passage area of the cover located on the traveling path of light used by the sensor unit for detecting information. Accordingly, at least a portion of the focal plane of the camera overlaps the light passage area. In addition, since it is prioritized to arrange the camera such that at least a portion of the focal plane overlaps the light passage area, an optical axis of the camera may extend in a direction different from a reference sensing direction of the sensor unit.

If the foreign substance adheres to the light passage area, the sensor unit may be obstructed from detecting the information of the outside area of the vehicle. However, since the adhesion of such a foreign substance is detected by the camera configured as described above, it is possible to perform appropriate treatment according to the detected result. Accordingly, it is possible to suppress degradation in the information detecting capability by the sensor unit covered by the cover forming a part of the outer surface of the vehicle.

Since the detection of the foreign substance adhering to the light passage area by the LiDAR sensor unit is relatively difficult, the detection of the foreign substance through the acquisition of the image of the area by the camera is more advantageous in combination with the LiDAR sensor unit.

The sensor system according to each of the third to fifth illustrative aspects may be configured so as to further comprise a nozzle configured to spray liquid, and such that the processor is configured to cause the nozzle to spray the liquid toward the light passage area in a case where adhesion of the foreign substance is detected.

According to such a configuration, it is possible to automate the treatment for removing the foreign substance adhering to the light passage area. Accordingly, the effect of suppressing degradation in the information detecting capability by the sensor unit covered by the cover forming a part of the outer surface of the vehicle is enhanced The sensor system according to each of the third to fifth illustrative aspects may be configured so as to further comprise a nozzle configured to spray liquid, and such that the processor is configured to specify a position where the foreign substance adheres, and to cause the nozzle to spray the liquid toward the position.

According to such a configuration, since the liquid is more accurately sprayed onto the foreign substance adhering to the light passage area, it is possible to increase the possibility of removing the foreign substance. Accordingly, the effect of suppressing degradation in the information detecting capability by the sensor unit covered by the cover forming a part of the outer surface of the vehicle is further enhanced.

The sensor system according to each of the third to fifth illustrative aspects may be configured such that the camera comprises: an image pickup element; a resin lens configured to form an image on the image pickup element; and a circuit board supporting the image pickup element and the resin lens.

According to such a configuration, since the space occupied by the camera can be considerably reduced, it is possible to arrange the camera for acquiring the image of the light passage area with higher degree of freedom. Accordingly, it is possible to make easier to suppress degradation in the information detecting capability by the sensor unit covered by the cover forming a part of the outer surface of the vehicle.

The sensor system according to each of the third to fifth illustrative aspects may be configured so as to further comprise a lamp unit configured to emit illumination light to the outside area of the vehicle, and such that the cover is configured to allow passage of the illumination light.

Because of the function of supplying illumination light to the outside area of the vehicle, the lamp unit is generally disposed in a place in the vehicle where there are few obstructions. By disposing also the sensor unit in such a place, it is possible to efficiently obtain information of the outside area of the vehicle.

As used herein, the term "light" means not only visible light but also an electromagnetic wave having an arbitrary wavelength such as ultraviolet light, infrared light, microwave, millimeter wave, or the like.

As used herein, the term "sensor unit" means a constituent unit of a component that can be distributed by itself as a single unit while providing a desired information detecting function.

As used herein, the term "lamp unit" means a constituent unit of a component that can be distributed by itself as a single unit while providing a desired lighting function.

DESCRIPTION OF EMBODIMENTS

Examples of embodiments will be described below in detail with reference to the accompanying drawings. In each of the drawings used in the following descriptions, the scale is appropriately changed in order to make each of the members have a recognizable size.

In the accompanying drawings, an arrow F represents a forward direction of the illustrated structure. An arrow B represents a rearward direction of the illustrated structure. An arrow U represents an upward direction of the illustrated structure. An arrow D represents a downward direction of the illustrated structure. An arrow L represents a leftward direction of the illustrated structure. An arrow R represents a rightward direction of the illustrated structure. The terms "left" and "right" used in the following descriptions represent the left-right directions as viewed from the driver's seat.

Figure 1:
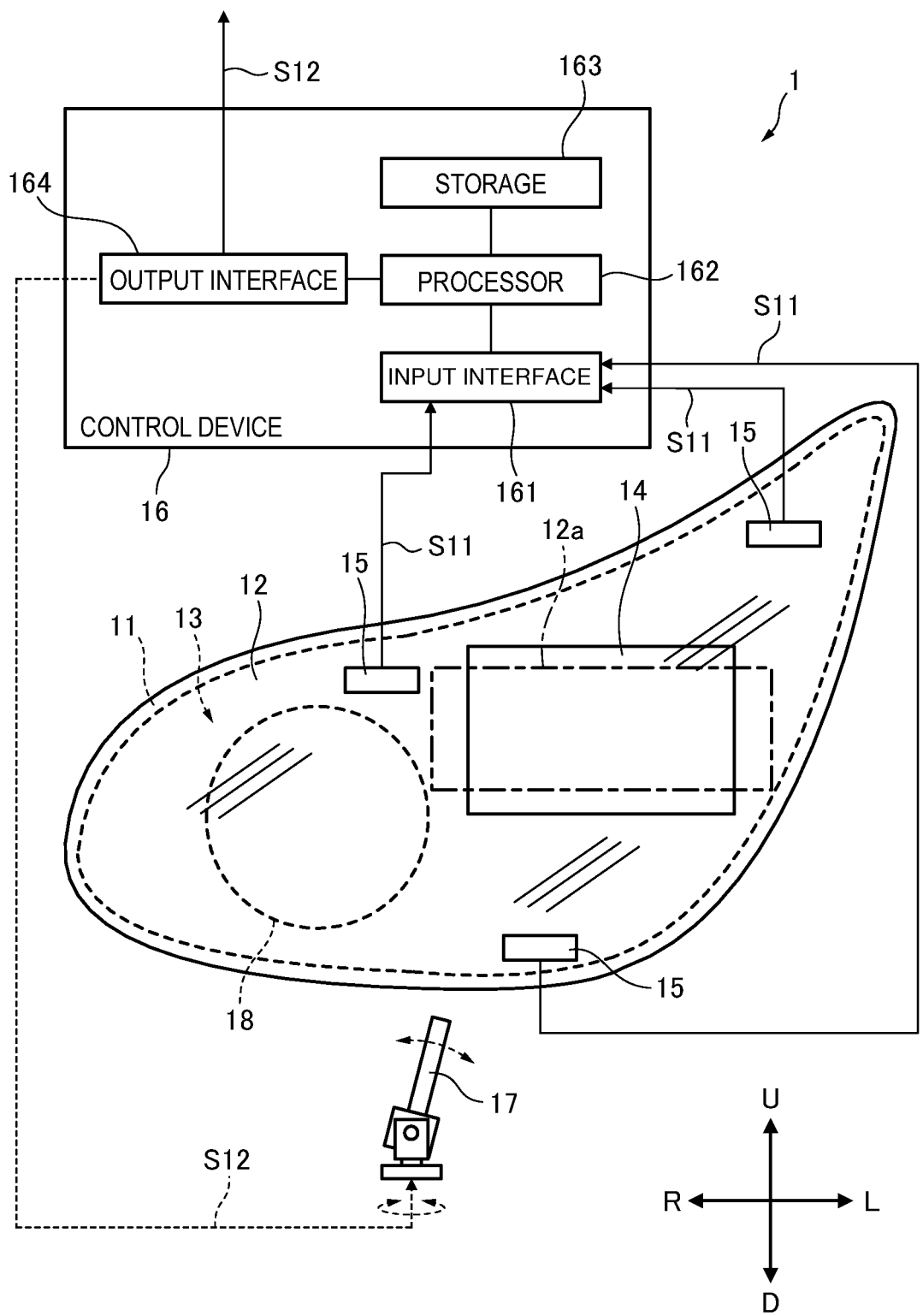
FIG. 1 illustrates a configuration of a sensor system according to a first embodiment.
Figure 2:
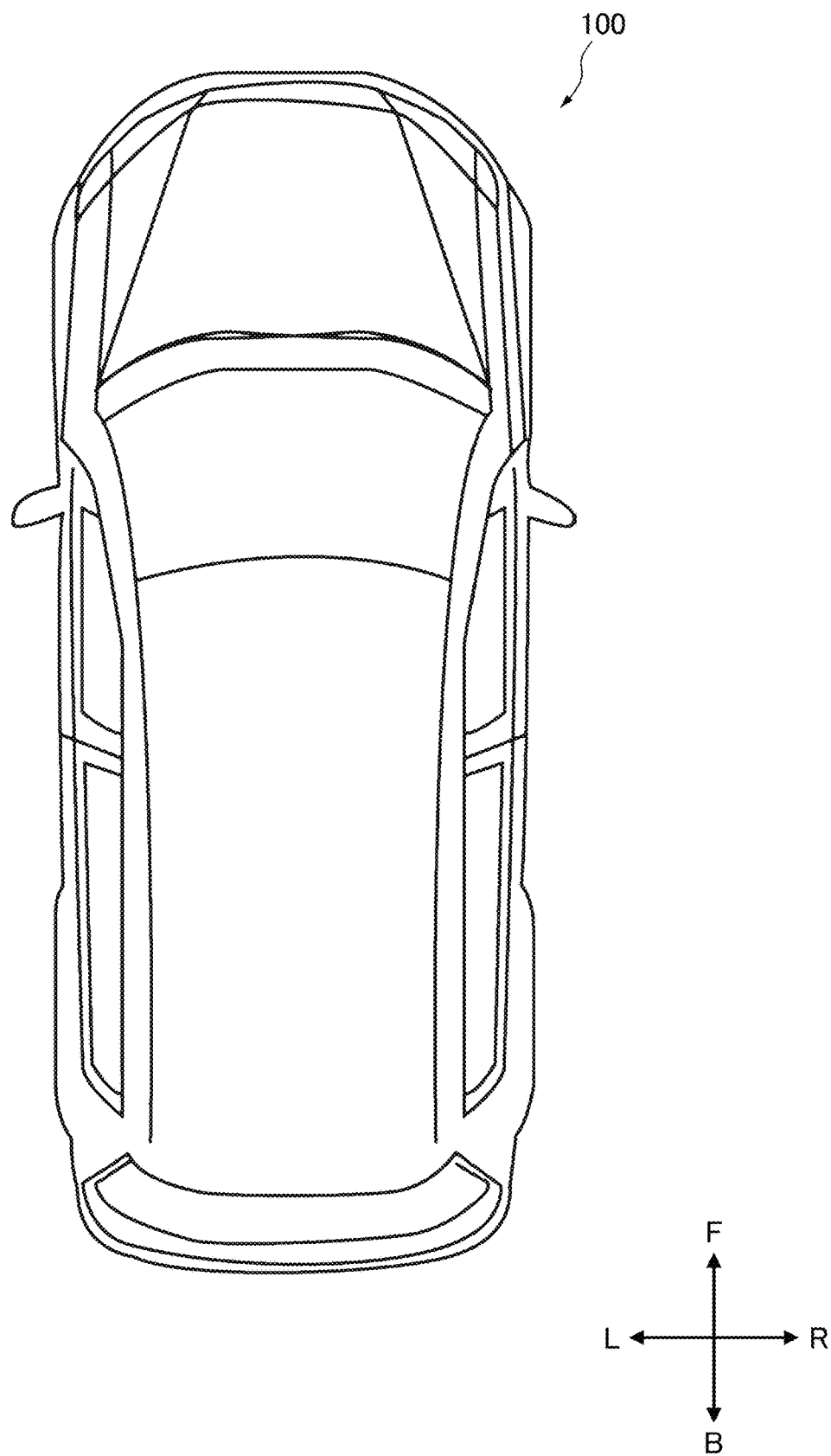
FIG. 2 illustrates an appearance of a vehicle in which the sensor system of FIG. 1 is to be installed.

FIG. 1 schematically illustrates a configuration of a sensor system 1 according to a first embodiment. The sensor system 1 is installed in a vehicle 100 illustrated in FIG. 2. The shape of the vehicle body of the vehicle 100 is a mere example.

The sensor system 1 includes a housing 11 and a cover 12. The housing 11 defines an accommodation chamber 13 together with the cover 12.

The sensor system 1 includes a LiDAR sensor unit 14. The LiDAR sensor unit 14 is disposed in the accommodation chamber 13. The cover 12 forms a part of the outer face of the vehicle 100 so as to cover the LiDAR sensor unit 14.

Figure 3A:
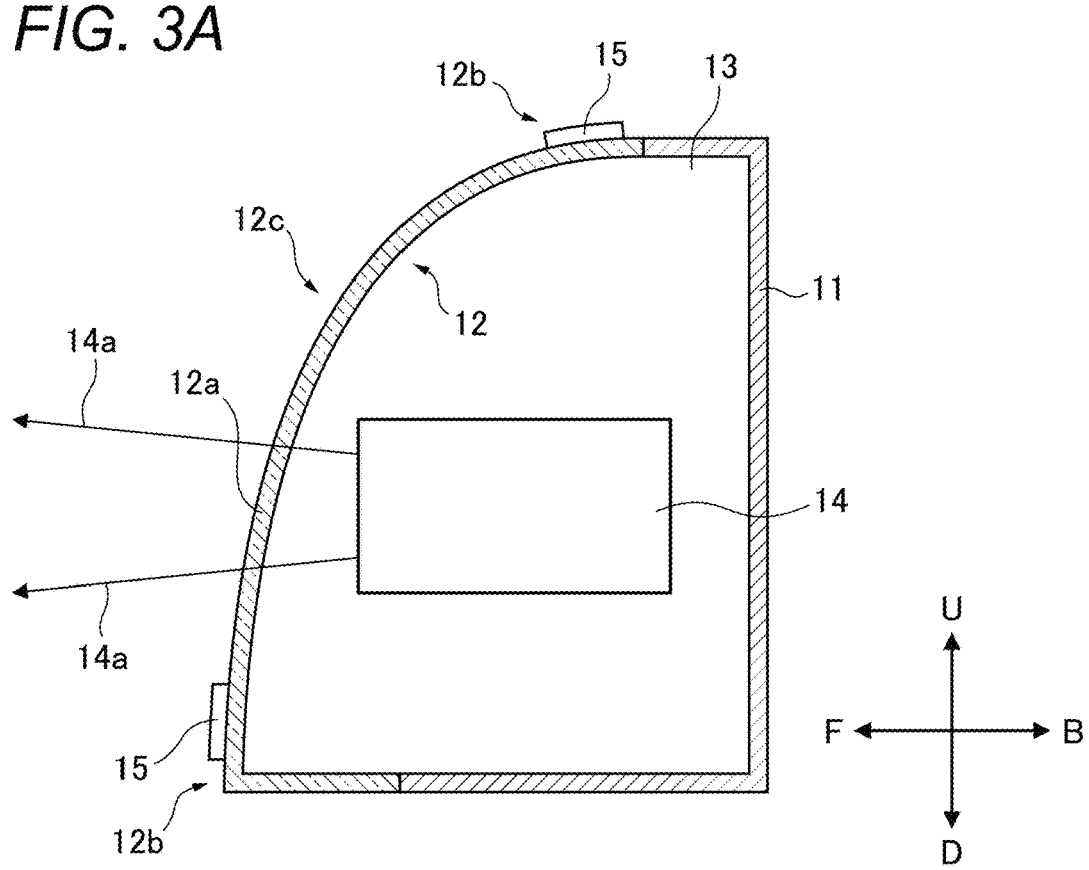
FIG. 3A illustrates an exemplary arrangement of strain gages in the sensor system of FIG. 1.

As illustrated in FIG. 3A, the LiDAR sensor unit 14 has a configuration for emitting sensing light 14a toward a sensing area outside the vehicle 100, and a configuration for detecting returned light (not illustrated) as a result of the sensing light 14a being reflected by an object existing in the sensing area. As the sensing light 14a, for example, infrared light having a wavelength of 905 nm can be used.

The LiDAR sensor unit 14 can obtain the distance to the object associated with the returned light, for example, based on the time period from the time when the sensing light 14a is emitted in a certain direction to the time when the returned light is detected. In addition, by accumulating such distance data in association with the sensing position, it is possible to obtain information as to the shape of the object associated with the returned light. Additionally or alternatively, information as to an attribute such as the material of the object associated with the returned light can be acquired based on the difference in waveforms of the emitted light and the returned light. That is, the LiDAR sensor unit 14 is a device for detecting information of an outside area of the vehicle 100 using light.

The sensing light 14a and the returned light pass through a light passage area 12a in the cover 12. In other words, the cover 12 is formed of a material that allows passage of at least the sensing light 14a and the returned light.

The sensor system 1 includes a strain gauge 15. The strain gauge 15 is disposed on the cover 12. More specifically, the strain gauge 15 is disposed at a position other than the light passage area 12a of the cover 12. The strain gauge 15 is a device for detecting strain of the cover 12 at a position where it is disposed. The strain gauge 15 is an example of a displacement sensor. As illustrated in FIG. 1, the strain gauge 15 is configured to output a strain signal S11 corresponding to the detected strain. The detection of the strained state is performed, for example, for a period of 100 milliseconds every second.

The sensor system 1 may include a plurality of strain gauges 15. In the example illustrated in FIG. 1, three strain gauges 15 are disposed. By disposing more strain gauges 15, the distribution of the strain generated in the cover 12 can be detected with higher resolution.

The sensor system 1 includes a control device 16. The control device 16 includes an input interface 161 and a processor 162. The control device 16 may be disposed in the accommodation chamber 13 or may be supported by the housing 11 outside the accommodation chamber 13. Alternatively, the control device 16 may be disposed at an appropriate position in the vehicle 100 distant from the housing 11.

The input interface 161 receives the strain signal S11 outputted from the strain gauge 15. The processor 162 is configured to detect a foreign substance adhering to the cover 12 based on the strain signal S11. Examples of the foreign substance include raindrops, snow chips, sludge, and carcasses of insects. As required, the input interface 161 may include a signal processing circuit that converts the strain signal S11 into a form suitable for processing performed by the processor 162.

Figure 4:
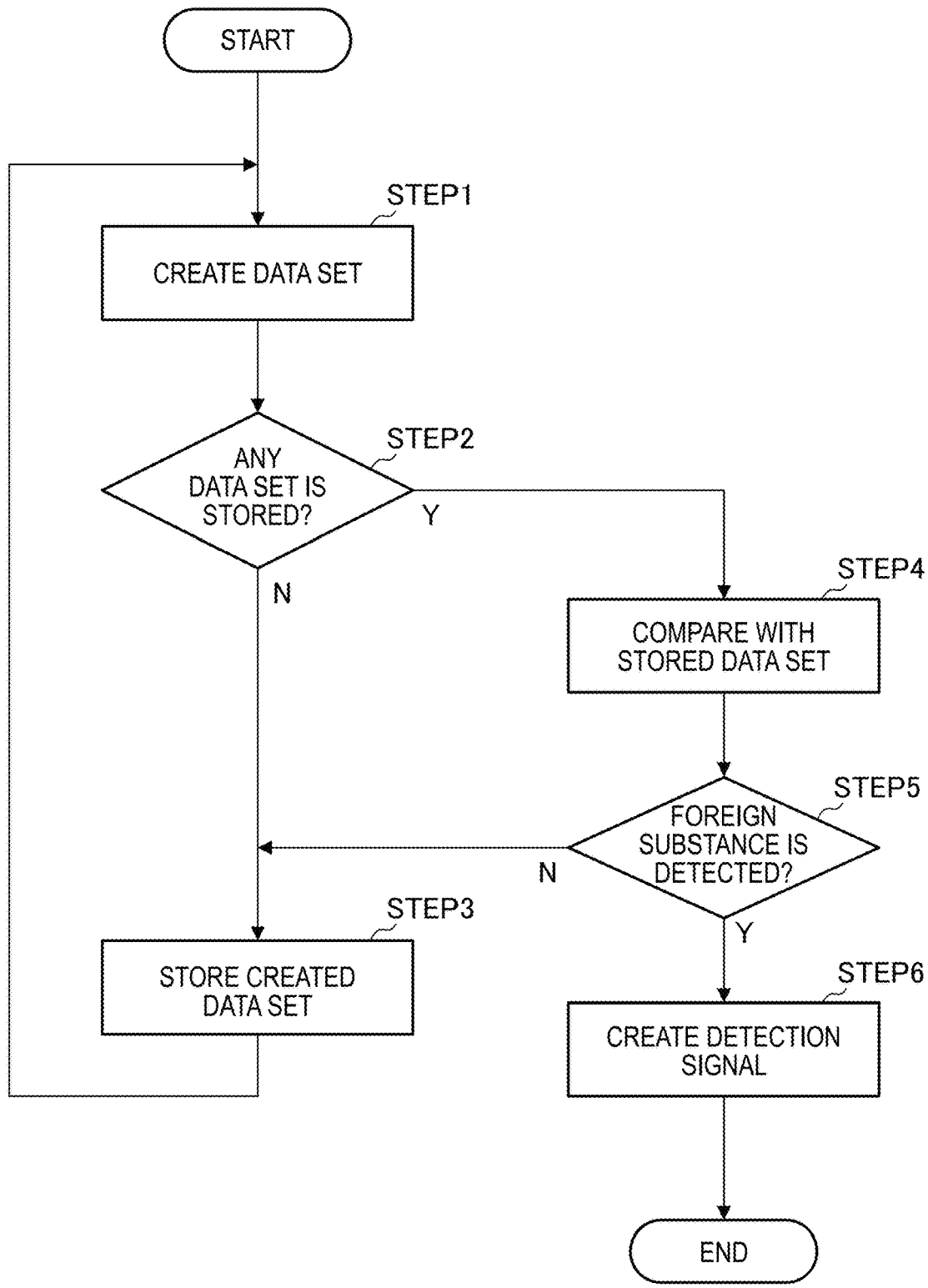
FIG. 4 illustrates a flow of processor performed by a processor in the sensor system of FIG. 1.

FIG. 4 illustrates an example of a flow of processing performed by the processor 162. Based on the strain signal S11, the processor 162 creates a data set D11, which is illustrated by way of example in FIG. 5A (STEP1). The data set D11 represents the temporal change of the magnitude ε of the strain within one detecting period. That is, the data set D11 includes n data pairs represented by (ε1, t1) to (εn, tn) (n is an integer of 2 or more). t1 to tn represent time points included in the detecting period. The interval between the time points tn−1 and tn corresponds to the sampling cycle.

As illustrated in FIG. 1, the control device 16 includes a storage 163. The storage 163 can be implemented by an appropriate rewritable semiconductor memory. As illustrated in FIG. 4, the processor 162 determines whether or not the data set D11 created in the past based on the above technique is stored in the storage 163 (STEP2).

If the data set D11 created in the past is not stored in the storage 163 (N in STEP2), the processor 162 stores the data set D11 created in STEP in the storage 163 (STEP3). The processing returns to STEP1.

When the data set D11 created in the past is stored in the storage 163 (Y in STEP2), the processor 162 compares the data set D11 created in STEP1 with the data set D11 stored in the storage 163 (STEP4).

For example, the processor 162 compares each of the data pairs (ε1, t1) to (εn, tn) in the data set D11 created in STEP1 with a corresponding one of the data pairs (ε1, t1) to (εn, tn) in the data set D11 stored in the storage 163.

Figure 5A:
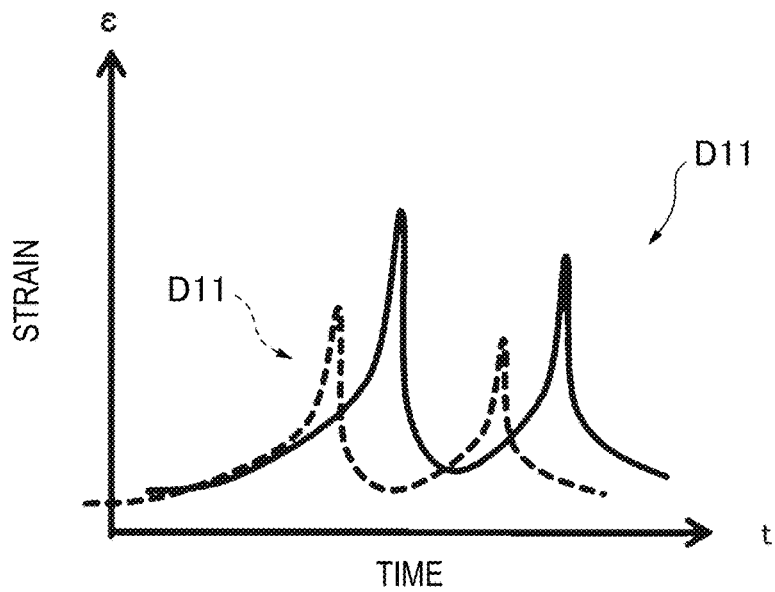
FIG. 5A illustrates an exemplary operation of the processor in the sensor system of FIG. 1.

The distribution of the strain generated in the cover 12 is not uniform, but the temporal change of the strain detected at the same position tends to be the same. Accordingly, the detected results repeatedly obtained by the same strain gauge 15 exhibit the same tendency. However, the adhesion of the foreign substance to the cover 12 causes a change in the distribution of the strain of the cover 12. Accordingly, even based on the strain signal S11 outputted from the same strain gauge 15, at least one of the values ε1 to εn related to the magnitude of the strain included in the data set D11 changes. In FIG. 5A, a data set D11 in a case where a foreign substance adheres is exemplified with dashed lines.

When a significant change is observed in at least one of the values ε1 to εn related to the magnitude of the strain, it is highly likely that a foreign substance is adhered to the cover 12. Based on the comparison result between the data sets D11, the processor 162 determines whether or not a foreign substance is adhered to the cover 12 (STEP5).

If no significant change is observed in at least one of the values ε1 to εn related to the magnitude of the strain, the processor 162 determines that no foreign substance is adhered to the cover 12 (N in STEP5). In this case, the data set D11 created in STEP1 is newly stored in the storage 163 (STEP3). Thereafter, the processing returns to STEP1. The data set D11 stored in the storage 163 will be subjected to comparison with the data set D11 to be created next time.

If a significant change is observed in at least one of the values ε1 to εn related to the magnitude of the strain, the processor 162 determines that a foreign substance is adhered to the cover 12 (Y in STEP5). In this case, the processor 162 creates a detection signal S12 indicating the adhesion of the foreign substance (STEP6).

It should be noted that by configuring the processor 162 so as to determine that a foreign substance is adhered when the number of pieces of data for which a significant change in the magnitude of strain is recognized exceeds a prescribed threshold value, the influence of noise can be suppressed, so that the detection accuracy of the foreign substance requiring removal can be enhanced.

Figure 5B:
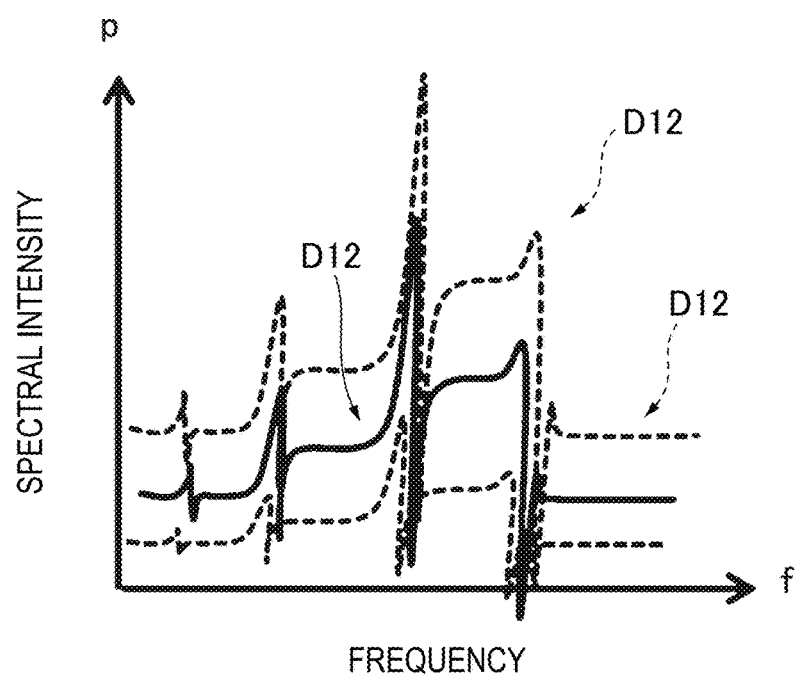
FIG. 5B illustrates another exemplary operation of the processor in the sensor system of FIG. 1.

Based on the strain signal S11, the processor 162 may create a data set D12, which is illustrated by way of example in FIG. 5B. The data set D12 represents a frequency spectrum of the strain signal S11 acquired in one detecting period. The frequency spectrum is obtained by performing Fourier transform or the like on the strain signal S11. That is, the data set D12 includes n data pairs represented by (p1, f1) to (pn, fn) (n is an integer of 2 or more). p1 to pn indicate spectral intensities. f1 to fn represent frequencies included in the spectrum. The interval between the frequencies fn−1 and fn corresponds to the resolution of the Fourier transform.

In this case, the processor 162 determines whether or not the data set D12 created in the past based on the above technique is stored in the storage 163 (STEP2).

If the data set D12 created in the past is not stored in the storage 163 (N in STEP2), the processor 162 stores the data set D12 created in STEP in the storage 163 (STEP3). Thereafter, the processing returns to STEP1.

If the data set D12 created in the past is stored in the storage 163 (Y in STEP2), the processor 162 compares the data set D12 created in STEP1 with the data set D12 stored in the storage 163 (STEP4).

For example, the processor 162 compares each of the data pairs (p1, f1) to (pn, fn) in the data set D12 created in STEP1 with a corresponding one of the data pairs (p1, f1) to (pn, fn) in the data set D12 stored in the storage 163.

The distribution of the strain generated in the cover 12 is not uniform, but the temporal change of the strain detected at the same position tends to be the same. Accordingly, the detected results repeatedly obtained by the same strain gauge 15 exhibit the same tendency. However, the adhesion of the foreign substance to the cover 12 causes a change in the distribution of the strain of the cover 12. Accordingly, even based on the strain signal S11 outputted from the same strain gauge 15, at least one of the values p1 to pn related to the spectral intensities included in the data set D12 changes.

In FIG. 5B, a data set D12 in a case where a foreign substance adheres is exemplified with dashed lines. In this example, only the spectral intensity at a frequency exhibiting a remarkable peak changes. However, the frequency exhibiting a remarkable peak may be shifted, and both a change in spectral intensity and a shift in frequency may occur.

When a significant change is observed in at least one of the values p1 to pn related to the spectral intensity, it is highly likely that a foreign substance is adhered to the cover 12. Based on the comparison result between the data sets D12, the processor 162 determines whether or not a foreign substance is adhered to the cover 12 (STEP5).

If no significant change is observed in at least one of the values p1 to pn related to the spectral intensity, the processor 162 determines that no foreign substance is adhered to the cover 12 (N in STEP5). In this case, the data set D12 created in STEP1 is newly stored in the storage 163 (STEP3). Thereafter, the processing returns to STEP1. The data set D12 stored in the storage 163 will be subjected to comparison with the data set D12 to be created next time.

If a significant change is observed in at least one of the values p1 to pn related to the spectral intensity, the processor 162 determines that a foreign substance is adhered to the cover 12 (Y in STEP5). In this case, the processor 162 creates a detection signal S12 indicating the adhesion of the foreign substance (STEP6).

It should be noted that by configuring the processor 162 so as to determine that a foreign substance is adhered when the number of pieces of data for which a significant change in the spectral intensity is recognized exceeds a prescribed threshold value, the influence of noise can be suppressed, so that the detection accuracy of the foreign substance requiring removal can be enhanced.

As illustrated in FIG. 1, the control device 16 includes an output interface 164. The processor 162 causes the output interface 164 to output the detection signal S12. The detection signal S12 may be transmitted to another control device in the vehicle 100. For example, the other control device may notify the occupant of the vehicle 100 that a foreign substance is adhered to the cover 12, based on the detection signal S12. Notifications may be made through at least one of a visual manner, an audible manner and a haptic manner.

The occupant who has received the notification can take an appropriate response. For example, the sensor system 1 may include a nozzle 17 that sprays liquid toward the cover 12. Examples of the liquid include water, hot water, and a cleaning liquid. The occupant may perform an operation of causing the nozzle 17 to spray liquid. As a result, it is possible to remove the foreign substance adhering to the cover 12.

If a foreign substance adheres to the light passage area 12a located on the traveling paths of the sensing light 14a and the returned light of the LiDAR sensor unit 14, the LiDAR sensor unit 14 may be obstructed from detecting the information of the outside area of the vehicle 100. However, since the adhesion of such a foreign substance is detected by the strain gauge 15 configured as described above, it is possible to perform appropriate treatment according to the detected result. Accordingly, it is possible to suppress degradation in the information detecting capability of the LiDAR sensor unit 14 covered by the cover 12 forming a part of the outer face of the vehicle 100.

As illustrated in FIG. 1, the detection signal S12 created by the processor 162 may be used to operate the nozzle 17 described above. That is, when a foreign substance adhering to the cover 12 is detected, the processor 162 can cause the nozzle 17 to spray liquid toward the cover 12.

According to such a configuration, it is possible to automate the treatment for removing the foreign substance adhering to the cover 12. Accordingly, it is possible to improve the effect of suppressing the degradation of the information detecting capability of the LiDAR sensor unit 14 covered by the cover 12 forming a part of the outer face of the vehicle 100.

The data set D11 or the data set D12 may include information as to the location of the strain gauge 15 that has outputted the strain signal S11 as the generator. Accordingly, the processor 162 may specify the position of the foreign substance on the cover 12 based on the locational information of the strain gauge 15 from which the significant strain is detected. On the other hand, as illustrated in FIG. 1, the nozzle 17 may include a mechanism capable of adjusting the spraying direction of the liquid. In this case, the processor 162 may configure the detection signal S12 so as to cause the nozzle 17 to spray the liquid toward the position of the detected foreign substance.

According to such a configuration, since the liquid is more accurately sprayed onto the foreign substance adhering to the cover 12, it is possible to increase the possibility of removing the foreign substance. Accordingly, the degradation of the information detecting capability of the LiDAR sensor unit 14 covered by the cover 12 forming a part of the outer face of the vehicle 100 is further suppressed.

As illustrated in FIG. 3A, the strain gauge 15 is preferably disposed on a peripheral portion 12b of the cover 12. As used herein, the term "peripheral portion of the cover" means a portion where a significant change occurs in the rigidity or flexibility of the cover. The cover 12 is coupled to the housing 11 at the peripheral portion 12b. Therefore, the peripheral portion 12b of the cover 12 has higher rigidity or lower flexibility than a non-peripheral portion 12c of the cover 12. In such a position where a significant change occurs in the rigidity or the flexibility, strain is likely to occur. Accordingly, by disposing the strain gauge in the peripheral portion 12b, it is possible to enhance the detection sensitivity of the strain. Accordingly, the degradation of the information detecting capability of the LiDAR sensor unit 14 covered by the cover 12 forming a part of the outer face of the vehicle 100 is further suppressed.

Figure 3B:
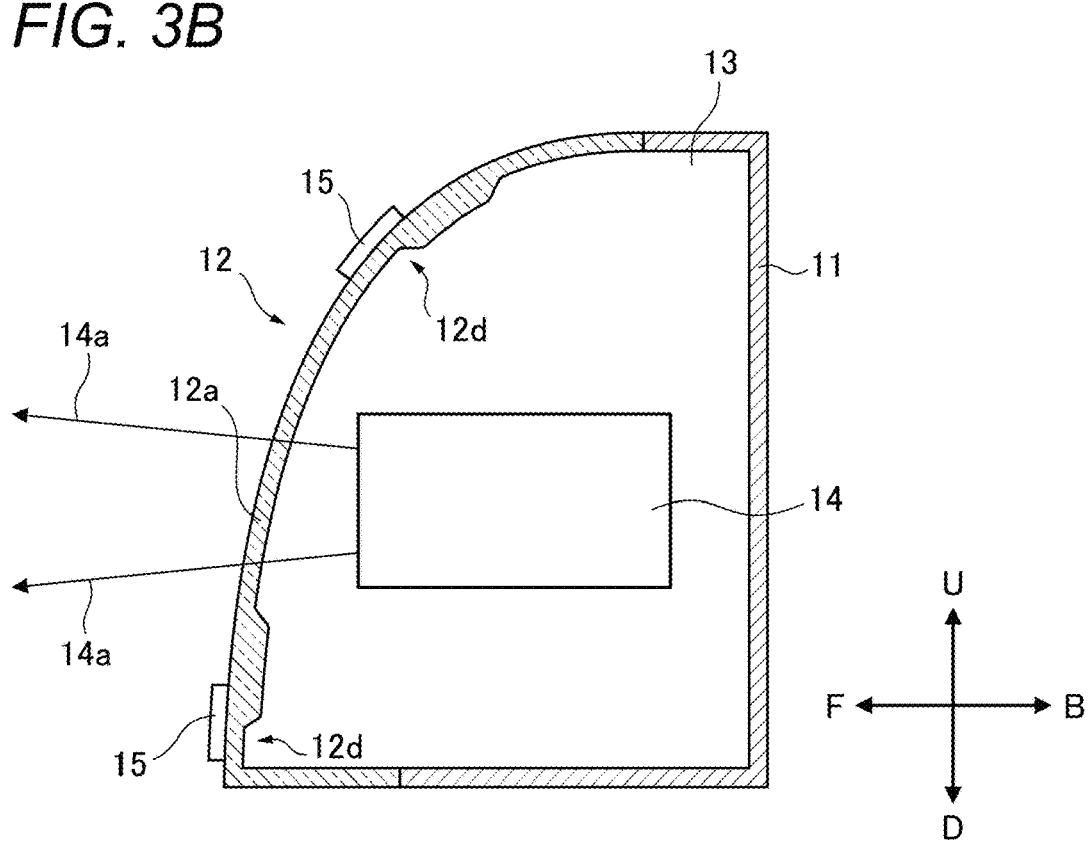
FIG. 3B illustrates another exemplary arrangement of strain gages in the sensor system of FIG. 1.

Alternatively, as illustrated in FIG. 3B, a thickness changing portion 12d in which the thickness of the cover 12 changes can be formed. In this case, it is preferable that the strain gauge 15 is disposed in the thickness changing portion 12d. In the thickness changing portion 12d, there is a change in the rigidity or flexibility of the cover 12. In such a position, strain is likely to occur. Accordingly, by disposing the strain gauge 15 in the thickness changing portion 12d, it is possible to enhance the detection sensitivity of the strain. Accordingly, the degradation of the information detecting capability of the LiDAR sensor unit 14 covered by the cover 12 forming a part of the outer face of the vehicle 100 is further suppressed.

As illustrated in FIG. 1, the sensor system 1 may include a lamp unit 18. The lamp unit 18 is a device for emitting illumination light to the outside area of the vehicle 100. Examples of the lamp unit 18 include a headlamp unit, a clearance lamp unit, a direction indicator lamp unit, a fog lamp unit, and a rear combination lamp unit.

The lamp unit 18 is disposed in the accommodation chamber 13. Accordingly, the lamp unit 18 is covered by the cover 12. The cover 12 also allows passage of the illumination light emitted from the lamp unit 18. In this case, the cover 12 is formed of a material that is also transparent to visible light.

Because of the function of supplying illumination light to the outside area of the vehicle 100, the lamp unit 18 is generally disposed in a place in the vehicle 100 where there are few obstructions. By disposing also the LiDAR sensor unit 14 in such a place, it is possible to efficiently obtain information of the outside area of the vehicle 100.

The processor 162 capable of performing the above-described processing may be provided as a general-purpose microprocessor operating in cooperation with a general-purpose memory, or may be provided as part of a dedicated integrated circuit device. Examples of the general-purpose microprocessor include a CPU, an MPU, and a GPU. Examples of the general-purpose memory include a RAM and a ROM. A rewritable general-purpose memory may serve the function of the storage 163. Examples of the dedicated integrated circuit element include a microcontroller, an ASIC, and an FPGA. The processor 162 and the storage 163 may be provided as separate devices or may be packaged in a single device.

Figure 6:
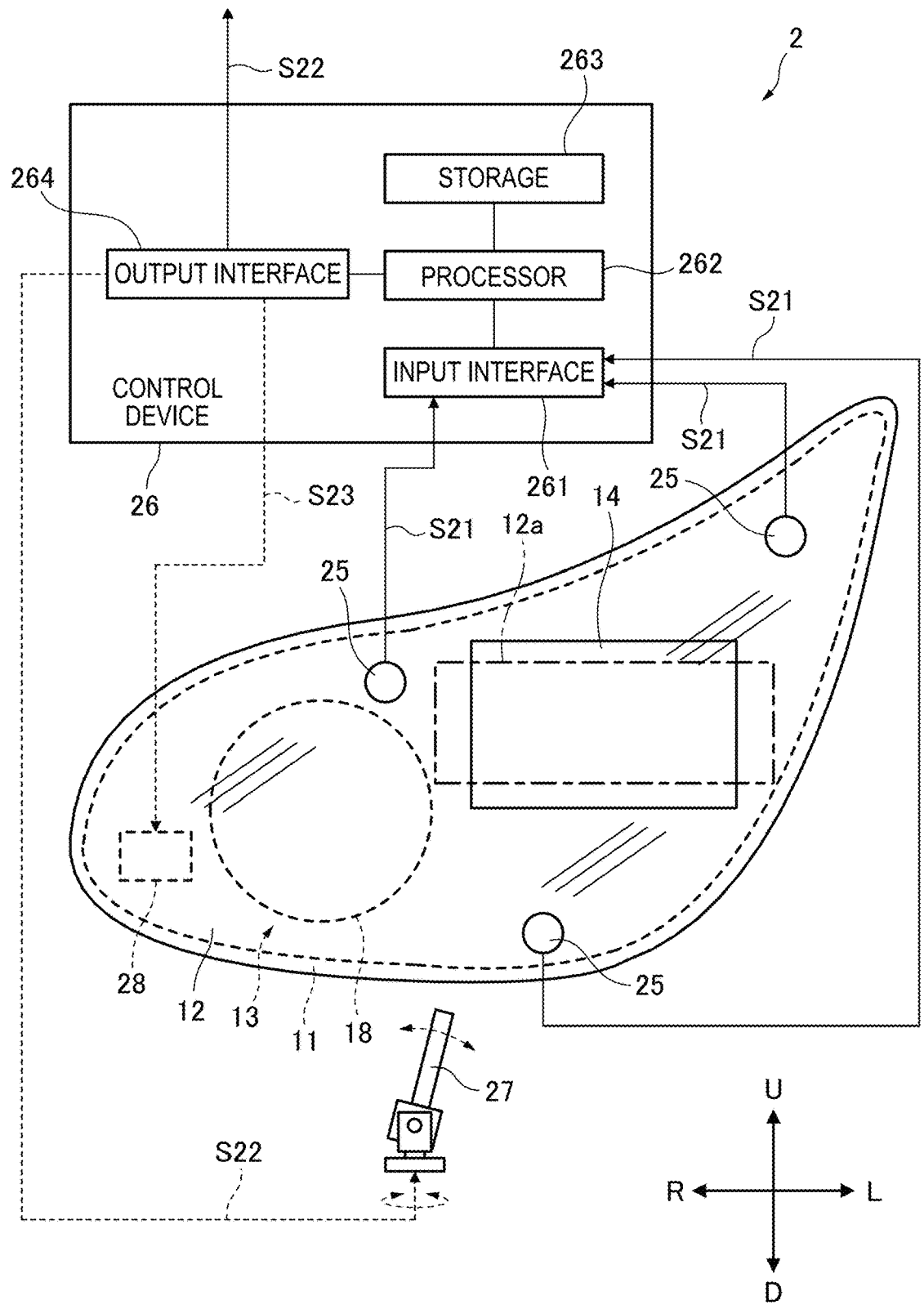
FIG. 6 illustrates a configuration of a sensor system according to a second embodiment.

FIG. 6 schematically illustrates a configuration of a sensor system 2 according to a second embodiment. Components that are substantially the same as those of the sensor system 1 according to the first embodiment are assigned with the same reference symbols, and repetitive descriptions for those will be omitted. The sensor system 2 is installed in the vehicle 100 illustrated in FIG. 2.

The sensor system 2 includes an acceleration sensor 25. The acceleration sensor 25 is disposed on the cover 12. More specifically, the acceleration sensor 25 is disposed at a position other than the light passage area 12a of the cover 12. The acceleration sensor 25 is a device for detecting vibration of the cover 12 at a position where the acceleration sensor 25 is disposed. The acceleration sensor 25 is an example of the displacement sensor. The acceleration sensor 25 is configured to output a vibration signal S21 corresponding to the detected vibration. The detection of the vibration is performed, for example, for a period of 100 milliseconds every second.

The sensor system 2 may include a plurality of acceleration sensors 25. In the example illustrated in FIG. 6, three acceleration sensors 25 are disposed. By disposing more acceleration sensors 25, the distribution of the vibrations generated in the cover 12 can be detected with higher resolution.

The sensor system 2 includes a control device 26. The control device 26 includes an input interface 261 and a processor 262. The control device 26 may be disposed in the accommodation chamber 13, or may be supported by the housing 11 outside the accommodation chamber 13. Alternatively, the control device 26 may be disposed at an appropriate position in the vehicle 100 distant from the housing 11.

The input interface 261 receives the vibration signal S21 outputted from the acceleration sensor 25. The processor 262 is configured to detect a foreign substance adhering to the cover 12 based on the vibration signal S21. Examples of the foreign substance include raindrops, snow chips, sludge, and carcasses of insects. As required, the input interface 261 may include a signal processing circuit that converts the vibration signal S21 into a form suitable for processing performed by the processor 262.

Referring to FIG. 4, a flow of processing performed by the processor 262 will be described. Based on the vibration signal S21, the processor 262 creates a data set D21, which is illustrated by way of example in FIG. 7A (STEP1). The processor 262 first creates a frequency spectrum of the vibration signal S21. The frequency spectrum is obtained by performing Fourier transform or the like on the vibration signal S21. Subsequently, the processor 262 specifies the resonance frequency fr based on the created frequency spectrum. That is, the data set D21 includes a data pair represented by (pr, fr). pr represents a spectral intensity at the resonance frequency fr.

As illustrated in FIG. 6, the control device 26 includes a storage 263. The storage 263 can be implemented by an appropriate rewritable semiconductor memory. Subsequently, the processor 262 determines whether or not the data set D21 created in the past based on the above technique is stored in the storage 263 (STEP2).

If the data set D21 created in the past is not stored in the storage 263 (N in STEP2), the processor 262 stores the data set D21 created in STEP1 in the storage 263 (STEP3). Thereafter, the processing returns to STEP1.

If the data set D21 created in the past is stored in the storage 263 (Y in STEP2), the processor 262 compares the data set D21 created in STEP1 with the data set D21 stored in the storage 263 (STEP4).

Specifically, the processor 262 compares the data pair (pr, fr) in the data set D21 created in STEP1 with the data pair (pr, fr) in the data set D21 stored in the storage 263.

Although the distribution of the vibrations generated in the cover 12 is not uniform, the vibrations detected at the same position exhibit the same tendency. Accordingly, the detected results repeatedly obtained by the same acceleration sensor 25 exhibit the same tendency. However, when the weight of the cover 12 changes due to the adhesion of the foreign substance, the distribution of vibrations in the cover 12 changes. Accordingly, even based on the vibration signal S21 outputted from the same acceleration sensor 25, at least one of the spectral intensity p and the resonance frequency fr included in the data set D21 changes.

Figure 7A:
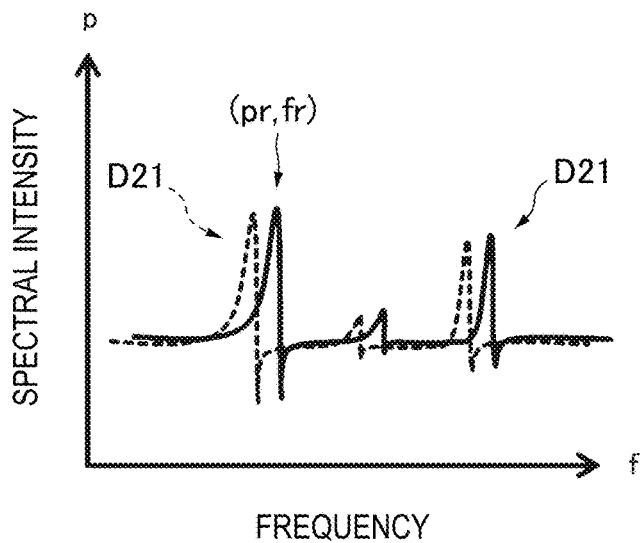
FIG. 7A illustrates an exemplary operation of a processor in the sensor system of FIG. 6.
Figure 7B:
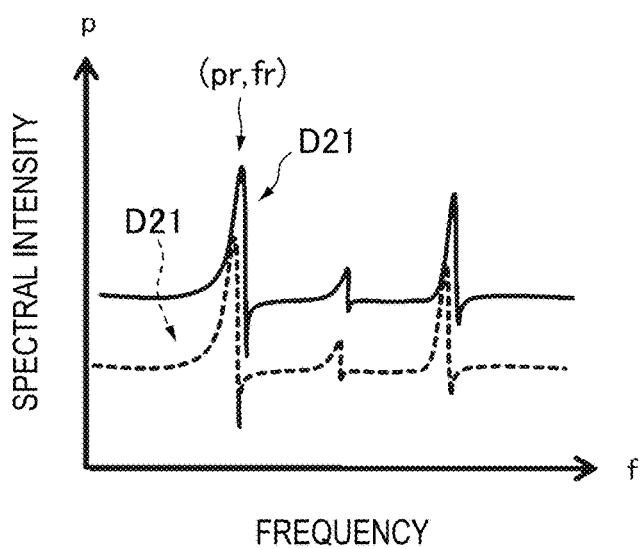
FIG. 7B illustrates another exemplary operation of the processor in the sensor system of FIG. 6.
Figure 7C:
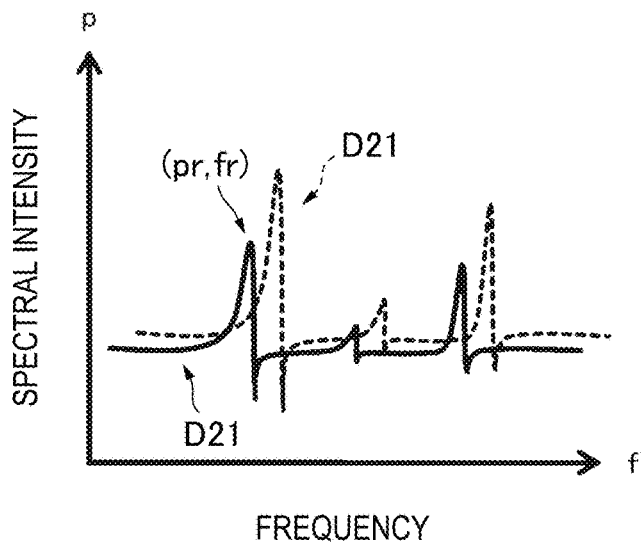
FIG. 7C illustrates another exemplary operation of the processor in the sensor system of FIG. 6.

In FIG. 7A, a data set D21 in a case where a foreign substance adheres is exemplified with dashed lines. In this example, the resonance frequency fr changes. Also in FIG. 7B and FIG. 7C, a data set D21 in a case where a foreign substance adheres is exemplified with dashed lines. In the example illustrated in FIG. 7B, the spectral intensity pr changes. In the example illustrated in FIG. 7C, both the spectral intensity pr and the resonance frequency fr change.

When a significant change is observed in at least one of the spectral intensity pr and the resonance frequency fr, it is highly likely that a foreign substance is adhered to the cover 12. Based on the comparison result between the data sets D21, the processor 262 determines whether or not a foreign substance is adhered to the cover 12 (STEP5).

If no significant change is observed in at least one of the spectral intensity pr and the resonance frequency fr, the processor 262 determines that no foreign substance is adhered to the cover 12 (N in STEP5). In this case, the data set D21 created in STEP1 is newly stored in the storage 263 (STEP3). Thereafter, the processing returns to STEP1. The data set D21 stored in the storage 263 is subjected to comparison with the data set D21 to be created next time.

If a significant change is observed in at least one of the spectral intensity pr and the resonance frequency fr, the processor 262 determines that a foreign substance is adhered to the cover 12 (Y in STEP5). In this case, the processor 262 creates a detection signal S22 indicating the adhesion of the foreign substance (STEP6).

In order to detect the adhesion of the foreign substance, the processor 262 may detect the adhesion of the foreign substance to the cover 12 using the technique described with reference to FIG. 5B. That is, the data set D21 may include n data pairs represented by (p1, f1) to (pn, fn) constituting the frequency spectrum (n is an integer of 2 or more).

In this case, the processor 262 compares each of the data pairs (p1, f1) to (pn, fn) in the data set D21 created in STEP1 with a corresponding one of the data pairs (p1, f1) to (pn, fn) in the data set D21 stored in the storage 263. If a significant change is observed in at least one of the values p1 to pn related to the spectral intensity, the processor 262 determines that a foreign substance is adhered to the cover 12. It should be noted that by configuring the processor 262 so as to determine that a foreign substance is adhered when the number of pieces of data for which a significant change in the spectral intensity is recognized exceeds a prescribed threshold value, the influence of noise can be suppressed, so that the detection accuracy of the foreign substance requiring removal can be enhanced.

As illustrated in FIG. 6, the control device 26 includes an output interface 264. The processor 262 causes the output interface 264 to output the detection signal S22. The detection signal S22 may be transmitted to another control device in the vehicle 100. For example, the other control device may notify the occupant of the vehicle 100 that a foreign substance is adhered to the cover 12, based on the detection signal S22. Notifications may be made through at least one of a visual manner, an audible manner and a haptic manner.

The occupant who has received the notification can take an appropriate response. For example, the sensor system 2 may include a nozzle 27 that sprays liquid toward the cover 12. Examples of the liquid include water, hot water, and a cleaning liquid. The occupant may perform an operation of causing the nozzle 27 to spray liquid. As a result, it is possible to remove the foreign substance adhering to the cover 12.

If a foreign substance adheres to the light passage area 12a located on the traveling paths of the sensing light 14a and the returned light of the LiDAR sensor unit 14, the LiDAR sensor unit 14 may be obstructed from detecting the information of the outside area of the vehicle 100. However, since the adhesion of such a foreign substance is detected by the acceleration sensor 25 configured as described above, it is possible to perform appropriate treatment according to the detected result. Accordingly, it is possible to suppress degradation in the information detecting capability of the LiDAR sensor unit 14 covered by the cover 12 forming a part of the outer face of the vehicle 100.

As illustrated in FIG. 6, the detection signal S22 created by the processor 262 may be used to operate the nozzle 27 described above. That is, when a foreign substance adhering to the cover 12 is detected, the processor 262 can cause the nozzle 27 to spray liquid toward the cover 12.

According to such a configuration, it is possible to automate the treatment for removing the foreign substance adhering to the cover 12. Accordingly, it is possible to improve the effect of suppressing the degradation of the information detecting capability of the LiDAR sensor unit 14 covered by the cover 12 forming a part of the outer face of the vehicle 100.

The data set D21 may include information as to the location of the acceleration sensor 25 that has outputted the vibration signal S21 as the generator. Accordingly, the processor 262 may specify the position of the foreign substance on the cover 12 based on the locational information of the acceleration sensor 25 that detected a significant change in the natural vibration. On the other hand, as illustrated in FIG. 6, the nozzle 27 may include a mechanism capable of adjusting the spraying direction of the liquid. In this case, the processor 262 may configure the detection signal S22 so as to cause the nozzle 27 to spray the liquid toward the position of the detected foreign substance.

According to such a configuration, since the liquid is more accurately sprayed onto the foreign substance adhering to the cover 12, it is possible to increase the possibility of removing the foreign substance. Accordingly, the degradation of the information detecting capability of the LiDAR sensor unit 14 covered by the cover 12 forming a part of the outer face of the vehicle 100 is further suppressed.

As illustrated in FIG. 6, the sensor system 2 may include an actuator 28. The actuator 28 is a device for vibrating the cover 12. The actuator 28 may be implemented by a piezoelectric element, a voice coil, an ultrasonic actuator, or the like. The processor 262 may create a control signal S23 for controlling the operation of the actuator 28. The control signal S23 is inputted to the actuator 28 via the output interface 264. The actuator 28 preferably operates to excite natural vibrations in the cover 12.

According to such a configuration, by actively vibrating the cover 12, it is possible to make the change of the vibration mode detected by the acceleration sensor 25 more remarkable. Accordingly, the influence of noise can be suppressed, so that the detection accuracy of the foreign substance requiring removal can be enhanced. Accordingly, the degradation of the information detecting capability of the LiDAR sensor unit 14 covered by the cover 12 forming a part of the outer face of the vehicle 100 is further suppressed.

Figure 8A:
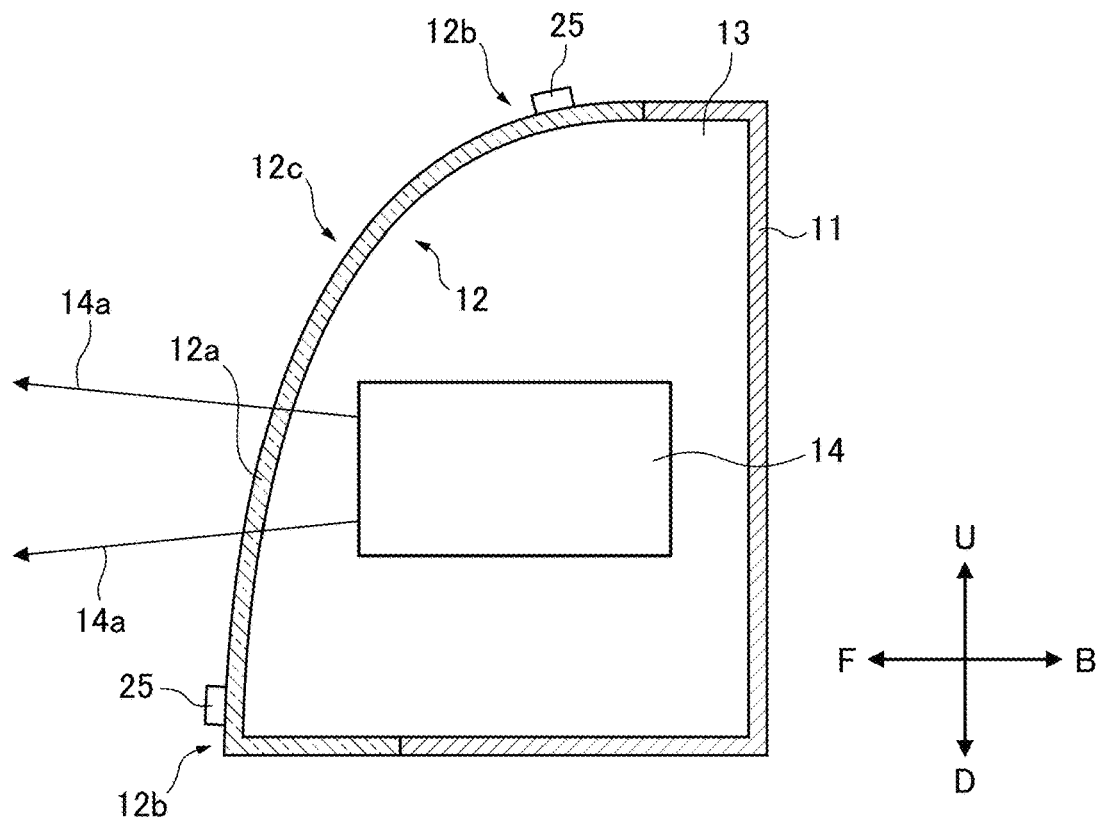
FIG. 8A illustrates an exemplary arrangement of acceleration sensors in the sensor system of FIG. 6.

As illustrated in FIG. 8A, it is preferable that the acceleration sensor 25 is disposed on the peripheral portion 12b of the cover 12. The cover 12 is coupled to the housing 11 at the peripheral portion 12b. Therefore, the peripheral portion 12b of the cover 12 has higher rigidity or lower flexibility than a non-peripheral portion 12c of the cover 12. In such a position where a significant change occurs in the rigidity or the flexibility, a change in the vibration mode is likely to occur. Accordingly, by disposing the acceleration sensor 25 in the peripheral portion 12b, it is possible to enhance the detection sensitivity of the change in the vibration mode. Accordingly, the degradation of the information detecting capability of the LiDAR sensor unit 14 covered by the cover 12 forming a part of the outer face of the vehicle 100 is further suppressed.

Figure 8B:
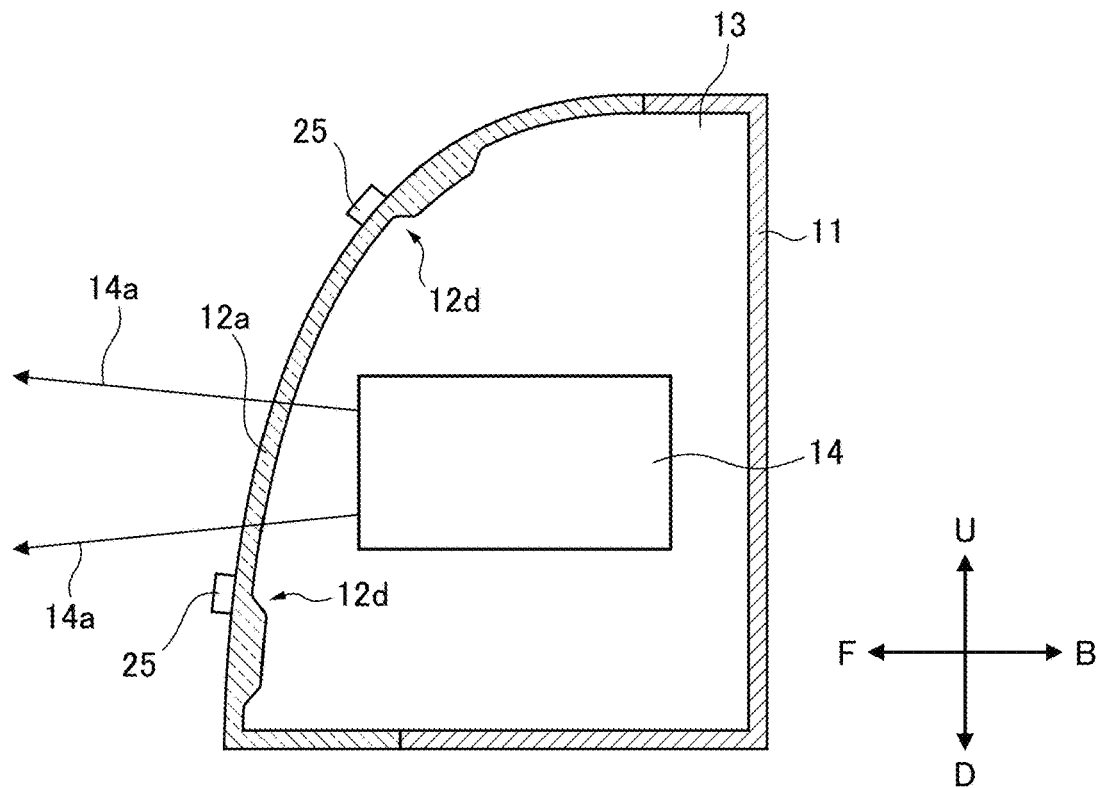
FIG. 8B illustrates another exemplary arrangement of acceleration sensors in the sensor system of FIG. 6.

Alternatively, as illustrated in FIG. 8B, a thickness changing portion 12d in which the thickness of the cover 12 changes can be formed. In this case, it is preferable that the acceleration sensor 25 is disposed in the thickness changing portion 12d. In the thickness changing portion 12d, there is a change in the rigidity or flexibility of the cover 12. In such a position, a change in the vibration mode is likely to occur. Accordingly, by disposing the acceleration sensor 25 in the thickness changing portion 12d, it is possible to enhance the detection sensitivity of the change in the vibration mode. Accordingly, the degradation of the information detecting capability of the LiDAR sensor unit 14 covered by the cover 12 forming a part of the outer face of the vehicle 100 is further suppressed.

As illustrated in FIG. 6, the sensor system 2 may include a lamp unit 18. Because of the function of supplying illumination light to the outside area of the vehicle 100, the lamp unit 18 is generally disposed in a place in the vehicle 100 where there are few obstructions. By disposing also the LiDAR sensor unit 14 in such a place, it is possible to efficiently obtain information of the outside area of the vehicle 100.

The processor 262 capable of performing the above-described processing may be provided as a general-purpose microprocessor operating in cooperation with a general-purpose memory, or may be provided as part of a dedicated integrated circuit device. Examples of the general-purpose microprocessor include a CPU, an MPU, and a GPU. Examples of the general-purpose memory include a RAM and a ROM. A rewritable general-purpose memory may serve the function of the storage 263. Examples of the dedicated integrated circuit element include a microcontroller, an ASIC, and an FPGA. The processor 262 and the storage 263 may be provided as separate devices or may be packaged in a single device.

Figure 9:
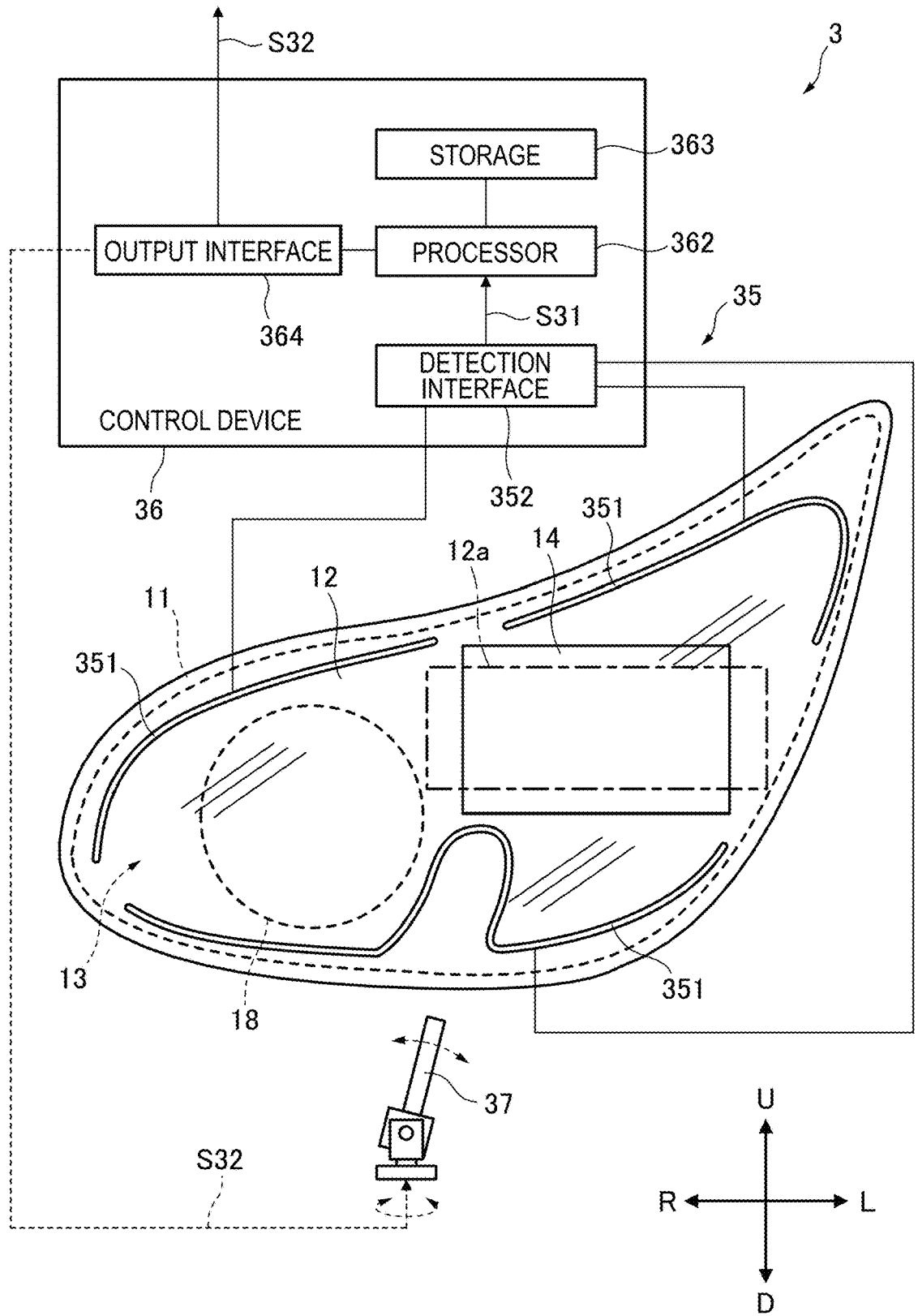
FIG. 9 illustrates a configuration of a sensor system according to a third embodiment.

FIG. 9 schematically illustrates a configuration of a sensor system 3 according to a third embodiment. Components that are substantially the same as those of the sensor system 1 according to the first embodiment are assigned with the same reference symbols, and repetitive descriptions for those will be omitted. The sensor system 3 is installed in the vehicle 100 illustrated in FIG. 2.

The sensor system 3 includes an optical fiber sensor 35 and a control device 36. The optical fiber sensor 35 includes an optical fiber 351 and a detection interface 352.

The optical fiber sensor 35 is a device for detecting strain of the cover 12 at a position where the optical fiber 351 is disposed. The optical fiber sensor 35 is an example of the displacement sensor. The optical fiber sensor 35 may adopt a method of detecting reflected light generated by an FBG (Fiber Bragg Grating) formed in the optical fiber 351, a method of detecting Rayleigh scattered light or Brillouin scattered light generated by glass particles forming the optical fiber 351, or the like. Since the configuration itself of the optical fiber sensor according to each method is well known, detailed descriptions thereof will be omitted.

The optical fiber 351 is disposed on the cover 12. More specifically, the optical fiber 351 is disposed at a position other than the light passage area 12a of the cover 12. The optical fiber 351 is bonded or deposited on an outer face of the cover 12. The outer diameter of the optical fiber 351 is, for example, 125 μm to 150 μm. The optical fiber sensor 35 may include a plurality of optical fibers 351. In the example illustrated in FIG. 9, three optical fibers 351 are disposed. By disposing more optical fibers 351, the distribution of the strain generated in the cover 12 can be detected with higher resolution.

The detection interface 352 may constitute a part of the control device 36. The control device 36 may be disposed in the accommodation chamber 13 or may be supported by the housing 11 outside the accommodation chamber 13. Alternatively, the control device 36 may be disposed at an appropriate position in the vehicle 100 distant from the housing 11.

The detection interface 352 includes a wavelength-variable laser light source. The wavelength of the light emitted from the wavelength-variable laser light source may be variable, for example, in the range of 1510 nm to 1570 nm. The light emitted from the wavelength-variable laser light source is incident on the optical fiber 351.

The detection interface 352 includes a photodetector. The light incident on the optical fiber 351 propagates through the optical fiber 351 while generating reflected light by the FBG; returned light such as Rayleigh scattered light and Brillouin scattered light. The returned light is detected by a photodetector. The photodetector outputs a detection signal S31 corresponding to the intensity and the wavelength of the returned light.

The control device 36 includes a processor 362. The processor 362 is configured to detect a foreign substance adhering to the cover 12 based on the detection signal S31. Examples of the foreign substance include raindrops, snow chips, sludge, and carcasses of insects. As required, the detection interface 352 may include a signal processing circuit that converts the detection signal S31 into a form suitable for processing performed by the processor 362.

Referring to FIG. 4, a flow of processing performed by the processor 362 will be described. Based on the detection signal S31, the processor 362 creates a data set D31 illustrated as an example in FIG. 10A (STEP1). The processor 362 first creates a frequency spectrum of the detection signal S31. The frequency spectrum is obtained by performing Fourier transform or the like on the detection signal S31. Subsequently, the processor 362 specifies the resonance frequency fr based on the created frequency spectrum. That is, the data set D31 includes a data pair represented by (pr, fr). pr represents a spectral intensity at the resonance frequency fr.

As illustrated in FIG. 9, the control device 36 includes a storage 363. The storage 363 can be implemented by an appropriate rewritable semiconductor memory. Subsequently, the processor 362 determines whether or not the data set D31 created in the past based on the above technique is stored in the storage 363 (STEP2).

If the data set D31 created in the past is not stored in the storage 363 (N in STEP2), the processor 362 stores the data set D31 created in STEP1 in the storage 363 (STEP3). Thereafter, the processing returns to STEP1.

If the data set D31 created in the past is stored in the storage 363 (Y in STEP2), the processor 362 compares the data set D31 created in STEP1 with the data set D31 stored in the storage 363 (STEP4).

Specifically, the processor 362 compares the data pair (pr, fr) in the data set D31 created in STEP with the data pair (pr, fr) in the data set D31 stored in the storage 363.

Although the distribution of the vibrations generated in the cover 12 is not uniform, the strains detected at the same position exhibit the same tendency. Accordingly, the detected results repeatedly obtained by the returned light from the same optical fiber 351 exhibit the same tendency. However, when a foreign substance adheres to the cover 12, the distribution of the strain of the cover 12 changes, so that the optical fiber 351 disposed on the surface of the cover 12 is also strained. When strain is generated in the optical fiber 351, at least one of the intensity and the wavelength of the returned light is changed. Accordingly, even based on the detection signal S31 corresponding to the returned light from the same optical fiber 351, at least one of the spectral intensity p and the resonance frequency fr included in the data set D31 changes.

Figure 10A:
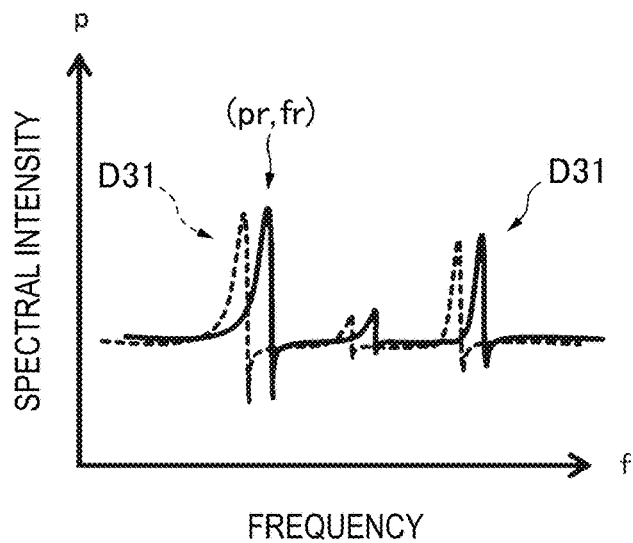
FIG. 10A illustrates an exemplary operation of a processor in the sensor system of FIG. 9.
Figure 10B:
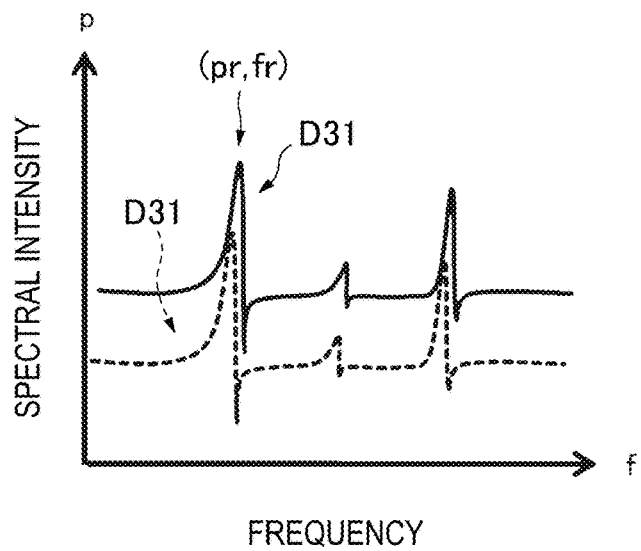
FIG. 10B illustrates another exemplary operation of the processor in the sensor system of FIG. 9.
Figure 10C:
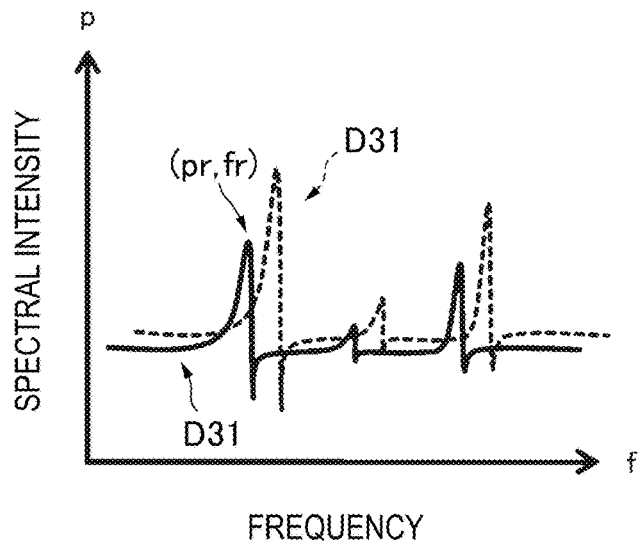
FIG. 10C illustrates another exemplary operation of the processor in the sensor system of FIG. 9.

In FIG. 10A, a data set D31 in a case where a foreign substance adheres is exemplified with dashed lines. In this example, the resonance frequency fr changes. Also in the example illustrated in FIG. 10B and FIG. 10C, the data set D31 in a case where a foreign substance adheres is exemplified with dashed lines. In the example illustrated in FIG. 10B, the spectral intensity pr changes. In the example illustrated in FIG. 10C, both the spectral intensity pr and the resonance frequency fr change.

When a significant change is observed in at least one of the spectral intensity pr and the resonance frequency fr, it is highly likely that a foreign substance is adhered to the cover 12. Based on the comparison result between the data sets D31, the processor 362 determines whether or not a foreign substance is adhered to the cover 12 (STEP5).

If no significant change is observed in at least one of the spectral intensity pr and the resonance frequency fr, the processor 362 determines that no foreign substance is adhered to the cover 12 (N in STEP5). In this case, the data set D31 created in STEP1 is newly stored in the storage 363 (STEP3). Thereafter, the processing returns to STEP1. The data set D31 stored in the storage 363 is subjected to comparison with the data set D21 to be created next time.

If a significant change is observed in at least one of the spectral intensity pr and the resonance frequency fr, the processor 362 determines that a foreign substance is adhered to the cover 12 (Y in STEP5). In this case, the processor 362 creates a detection signal S32 indicating the adhesion of the foreign substance (STEP6).

In order to detect the adhesion of the foreign substance, the processor 362 may detect the adhesion of the foreign substance to the cover 12 using the technique described with reference to FIG. 5B. That is, the data set D31 may include n data pairs represented by (p1, f1) to (pn, fn) constituting the frequency spectrum (n is an integer of 2 or more).

In this case, the processor 362 compares each of the data pairs (p1, f1) to (pn, fn) in the data set D31 created in STEP with a corresponding one of the data pairs (p1, f1) to (pn, fn) in the data set D31 stored in the storage 363. If a significant change is observed in at least one of the values p1 to pn related to the spectral intensity, the processor 362 determines that a foreign substance is adhered to the cover 12. It should be noted that by configuring the processor 362 so as to determine that a foreign substance is adhered when the number of pieces of data for which a significant change in the spectral intensity is recognized exceeds a prescribed threshold value, the influence of noise can be suppressed, so that the detection accuracy of the foreign substance requiring removal can be enhanced.

As illustrated in FIG. 9, the control device 36 includes an output interface 364. The processor 362 causes the output interface 364 to output the detection signal S32. The detection signal S32 may be transmitted to another control device in the vehicle 100. For example, the other control device may notify the occupant of the vehicle 100 that a foreign substance is adhered to the cover 12, based on the detection signal S32. Notifications may be made through at least one of a visual manner, an audible manner and a haptic manner.

The occupant who has received the notification can take an appropriate response. For example, the sensor system 3 may include a nozzle 37 that sprays liquid toward the cover 12. Examples of the liquid include water, hot water, and a cleaning liquid. The occupant may perform an operation of causing the nozzle 37 to spray liquid. As a result, it is possible to remove the foreign substance adhering to the cover 12.

If a foreign substance adheres to the light passage area 12a located on the traveling paths of the sensing light 14a and the returned light of the LiDAR sensor unit 14, the LiDAR sensor unit 14 may be obstructed from detecting the information of the outside area of the vehicle 100. However, since the adhesion of such a foreign substance is detected by the optical fiber sensor 35 configured as described above, it is possible to perform appropriate treatment according to the detected result. Accordingly, it is possible to suppress degradation in the information detecting capability of the LiDAR sensor unit 14 covered by the cover 12 forming a part of the outer face of the vehicle 100.

In particular, since the optical fiber 351 is light and flexible, the optical fiber 351 can be arranged on the cover 12 with a high degree of freedom. In addition, since the optical fiber 351 is very thin, even if it is disposed on the surface of the cover 12, the appearance or the design of the cover 12 is less influenced. In addition, a plurality of strain sensing points can be set in a single optical fiber 351. Accordingly, it is possible to enhance the degree of freedom in designing the sensor system 3 for suppressing the deterioration of the information detecting capability of the LiDAR sensor unit 14.

As illustrated in FIG. 9, the detection signal S32 created by the processor 362 may be used to operate the nozzle 37 described above. That is, when a foreign substance adhering to the cover 12 is detected, the processor 362 can cause the nozzle 37 to spray liquid toward the cover 12.

According to such a configuration, it is possible to automate the treatment for removing the foreign substance adhering to the cover 12. Accordingly, it is possible to improve the effect of suppressing the degradation of the information detecting capability of the LiDAR sensor unit 14 covered by the cover 12 forming a part of the outer face of the vehicle 100.

The data set D31 may include information as to the location of the optical fiber 351 that has outputted returned light for generating the detection signal S31. In a case where a plurality of sensing points are provided in one optical fiber 351, the data set D31 may also include information as to the position of each sensing point. Accordingly, the processor 362 may specify the position of the foreign substance on the cover 12 based on the locational information of the optical fiber 351 from which the significant strain is detected.

On the other hand, as illustrated in FIG. 9, the nozzle 37 may include a mechanism capable of adjusting the spraying direction of the liquid. In this case, the processor 362 may configure the detection signal S32 so as to cause the nozzle 37 to spray the liquid toward the position of the detected foreign substance.

According to such a configuration, since the liquid is more accurately sprayed onto the foreign substance adhering to the cover 12, it is possible to increase the possibility of removing the foreign substance. Accordingly, the degradation of the information detecting capability of the LiDAR sensor unit 14 covered by the cover 12 forming a part of the outer face of the vehicle 100 is further suppressed.

Figure 11A:
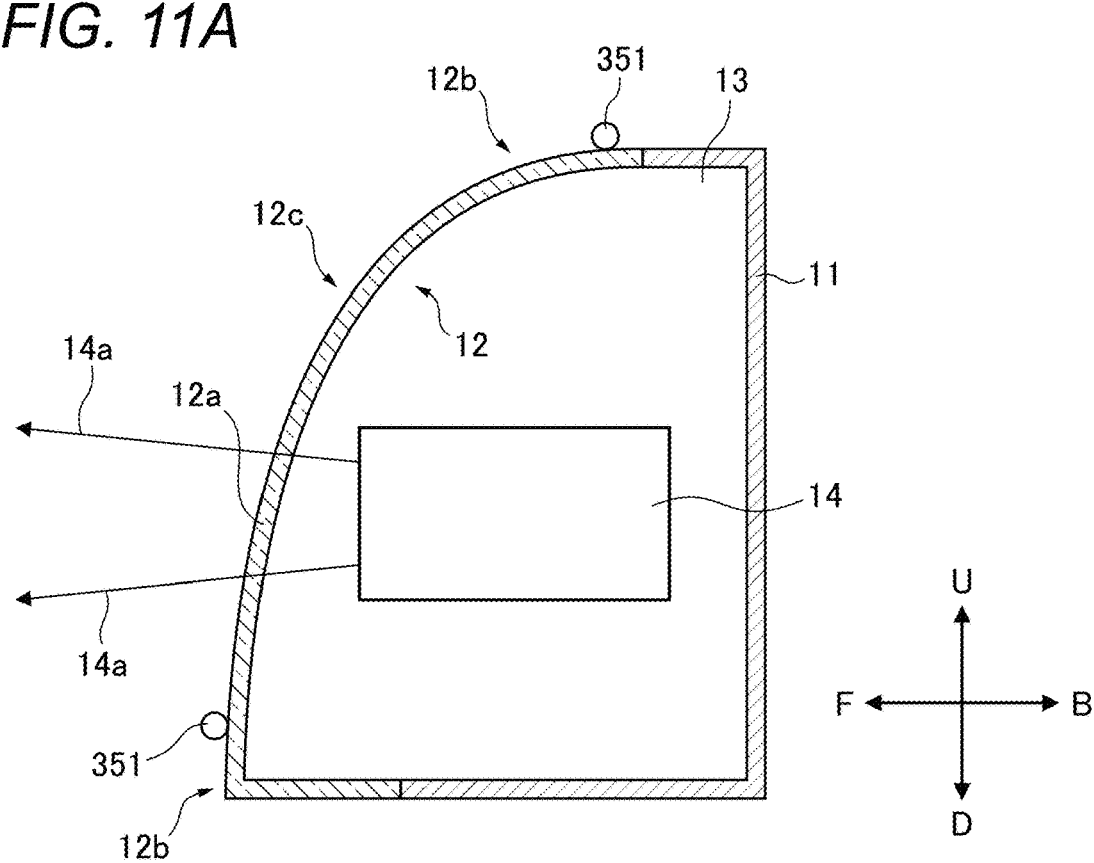
FIG. 11A illustrates an exemplary arrangement of optical fiber sensors in the sensor system of FIG. 9.

As illustrated in FIG. 11A, the optical fiber 351 is preferably disposed in the peripheral portion 12b of the cover 12. The optical fiber 351 is an example of a part of the displacement sensor. The cover 12 is coupled to the housing 11 at the peripheral portion 12b. Therefore, the peripheral portion 12b of the cover 12 has higher rigidity or lower flexibility than a non-peripheral portion 12c of the cover 12. In such a position where a significant change occurs in the rigidity or the flexibility, strain is likely to occur. Accordingly, by disposing the optical fiber 351 in the peripheral portion 12b, it is possible to enhance the detection sensitivity of the strain. Accordingly, the degradation of the information detecting capability of the LiDAR sensor unit 14 covered by the cover 12 forming a part of the outer face of the vehicle 100 is further suppressed.

Figure 11B:
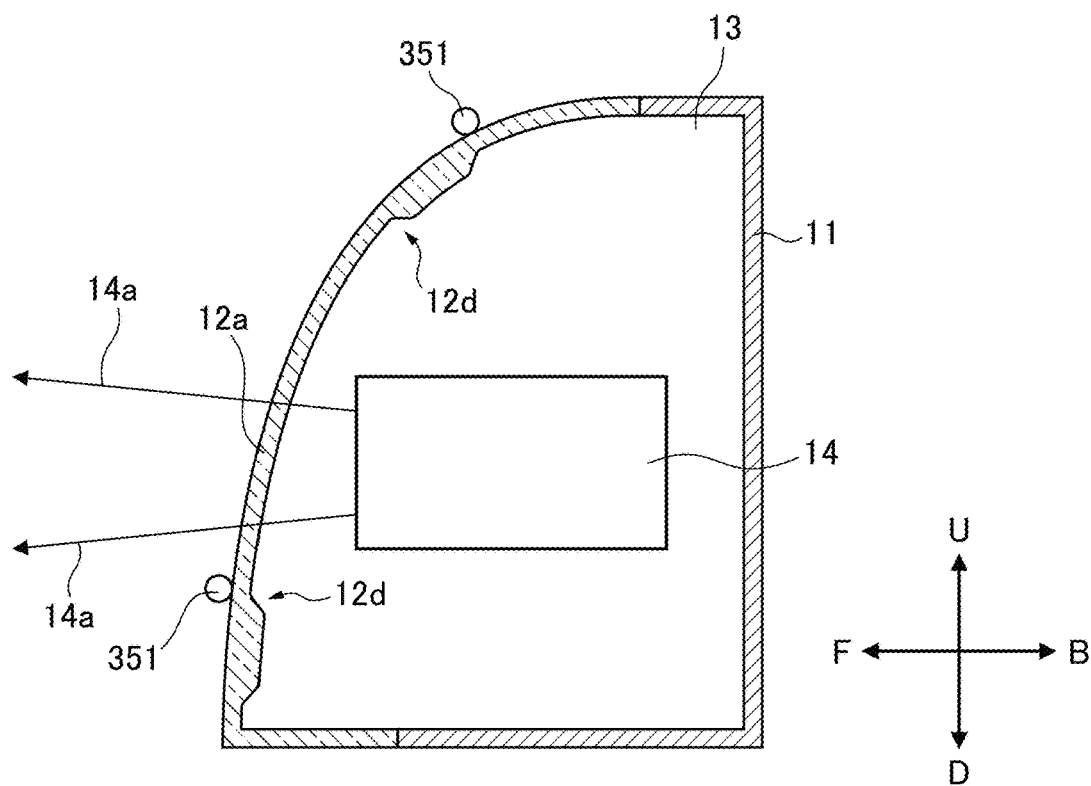
FIG. 11B illustrates another exemplary arrangement of optical fiber sensors in the sensor system of FIG. 9.

Alternatively, as illustrated in FIG. 11B, a thickness changing portion 12d in which the thickness of the cover 12 changes can be formed. In this case, it is preferable that the optical fiber 351 is disposed in the thickness changing portion 12d. In the thickness changing portion 12d, there is a change in the rigidity or flexibility of the cover 12. In such a position, strain is likely to occur. Accordingly, by disposing the optical fiber 351 in the thickness changing portion 12d, it is possible to enhance the detection sensitivity of the strain. Accordingly, the degradation of the information detecting capability of the LiDAR sensor unit 14 covered by the cover 12 forming a part of the outer face of the vehicle 100 is further suppressed.

As illustrated in FIG. 9, the sensor system 3 may include a lamp unit 18. Because of the function of supplying illumination light to the outside area of the vehicle 100, the lamp unit 18 is generally disposed in a place in the vehicle 100 where there are few obstructions. By disposing also the LiDAR sensor unit 14 in such a place, it is possible to efficiently obtain information of the outside area of the vehicle 100.

The processor 362 capable of performing the above-described processing may be provided as a general-purpose microprocessor operating in cooperation with a general-purpose memory, or may be provided as part of a dedicated integrated circuit device. Examples of the general-purpose microprocessor include a CPU, an MPU, and a GPU. Examples of the general-purpose memory include a RAM and a ROM. A rewritable general-purpose memory may serve the function of the storage 363. Examples of the dedicated integrated circuit element include a microcontroller, an ASIC, and an FPGA. The processor 362 and the storage 363 may be provided as separate devices or may be packaged in a single device.

Figure 12:
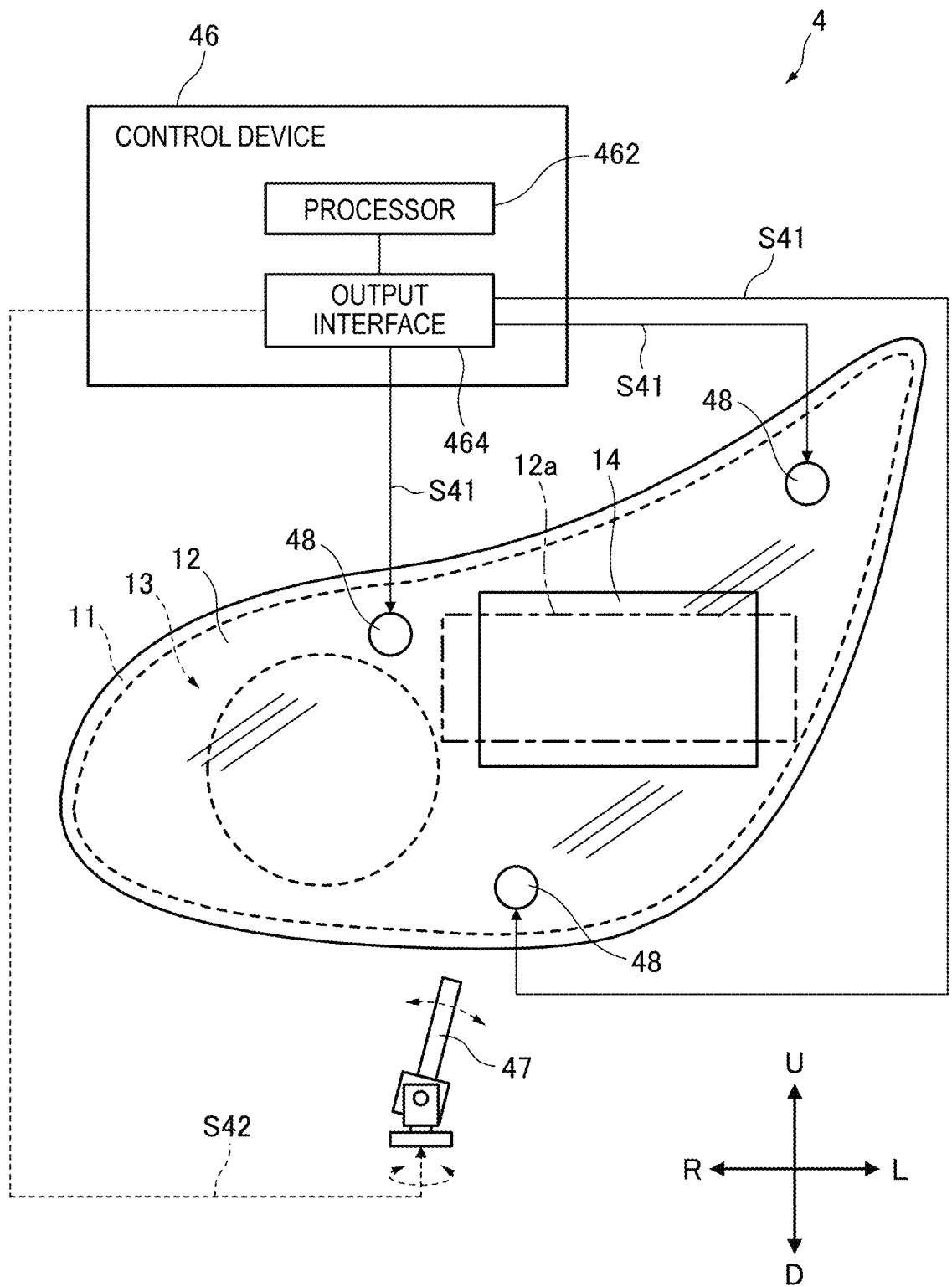
FIG. 12 illustrates a configuration of a sensor system according to a fourth embodiment.

FIG. 12 schematically illustrates a configuration of a sensor system 4 according to a fourth embodiment. Components that are substantially the same as those of the sensor system 1 according to the first embodiment are assigned with the same reference symbols, and repetitive descriptions for those will be omitted. The sensor system 4 is installed in the vehicle 100 illustrated in FIG. 2.

The sensor system 4 includes an ultrasonic actuator 48. The ultrasonic actuator 48 is a device that vibrates at a frequency in an ultrasonic band to excite natural vibration in the cover 12.

The sensor system 4 includes a control device 46. The control device 46 includes a processor 462 and an output interface 464. The processor 462 may create a control signal S41 for controlling the operation of the ultrasonic actuator 48. The control signal S41 is inputted to the ultrasonic actuator 48 via the output interface 464.

If a foreign substance adheres to the light passage area 12a located on the traveling paths of the sensing light 14a and the returned light of the LiDAR sensor unit 14, the LiDAR sensor unit 14 may be obstructed from detecting the information of the outside area of the vehicle 100. Examples of the foreign substance include raindrops, snow chips, sludge, and carcasses of insects. However, according to the configuration as described above, it is possible to promote the separation or removal of the adhered foreign substance by the vibrations of the cover 12 itself excited by the ultrasonic actuator 48. Accordingly, it is possible to suppress degradation in the information detecting capability of the LiDAR sensor unit 14 covered by the cover 12 forming a part of the outer face of the vehicle 100.

The sensor system 4 may include a nozzle 47 that sprays liquid toward the cover 12. Examples of the liquid include water, hot water, and a cleaning liquid. In this case, the processor 462 causes the output interface 464 to output a control signal S42 for causing the nozzle 47 to spray the liquid. The spraying of the liquid may be performed before the vibrations are excited in the cover 12 with the ultrasonic actuator 48, or may be performed while the vibrations are excited.

According to such a configuration, a so-called ultrasonic cleaning effect by the liquid sprayed from the nozzle 47 can be obtained, so that separation or removal of the foreign substance adhering to the cover 12 can be further promoted.

The processor 462 capable of performing the above-described processing may be provided as a general-purpose microprocessor operating in cooperation with a general-purpose memory, or may be provided as part of a dedicated integrated circuit device. Examples of the general-purpose microprocessor include a CPU, an MPU, and a GPU. Examples of the general-purpose memory include a RAM and a ROM. Examples of the dedicated integrated circuit element include a microcontroller, an ASIC, and an FPGA.

Figure 13:
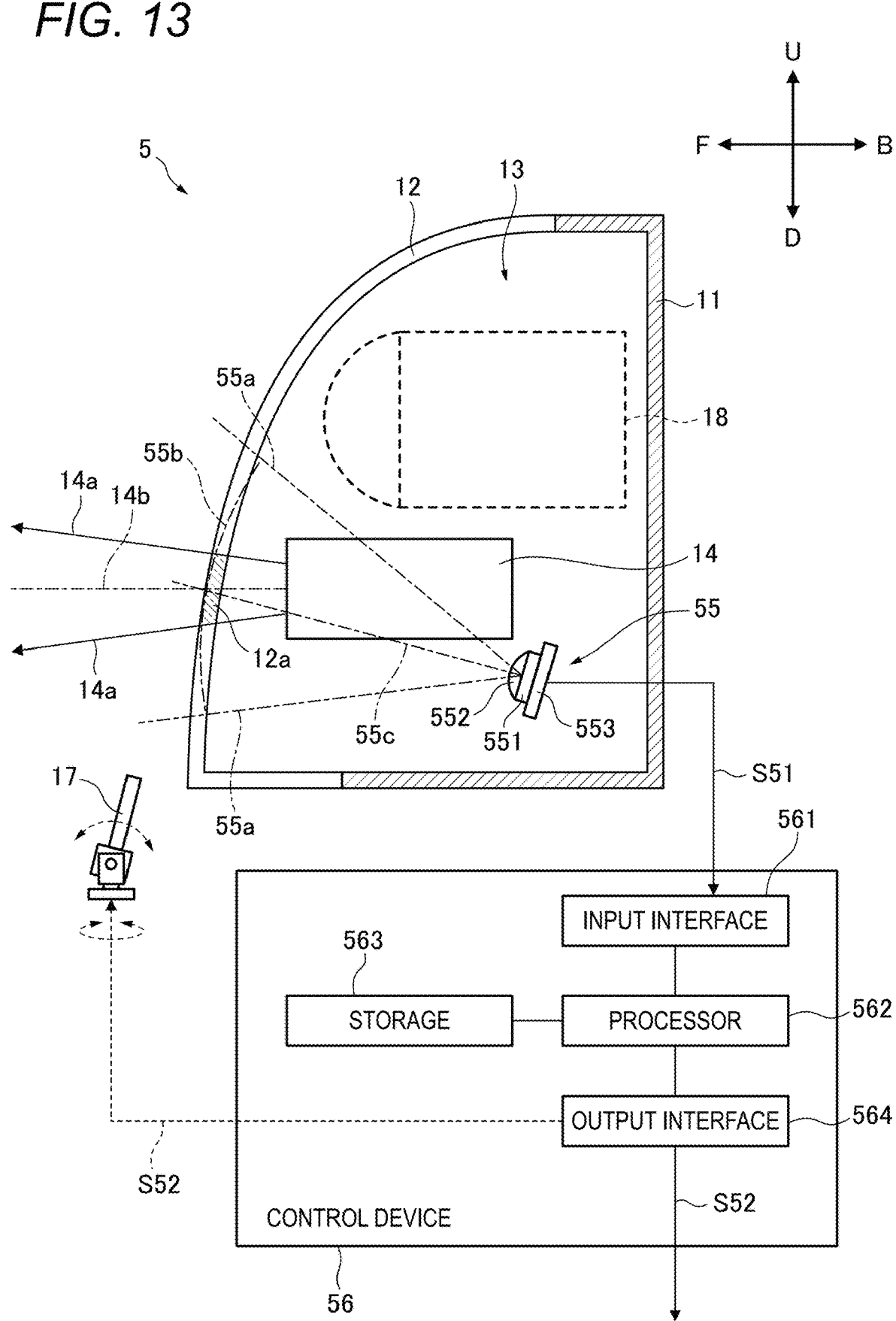
FIG. 13 illustrates an exemplary configuration of a sensor system according to a fifth embodiment.

FIG. 13 schematically illustrates an example of a configuration of a sensor system 5 according to a fifth embodiment. Components that are substantially the same as those of the sensor system 1 according to the first embodiment are assigned with the same reference symbols, and repetitive descriptions for those will be omitted. The sensor system 5 is installed in the vehicle 100 illustrated in FIG. 2.

The sensor system 5 includes a camera 55. The camera 55 is disposed in the accommodation chamber 13. Accordingly, the camera 55 is also covered by the cover 12.

The camera 55 is a device for acquiring an image of the light passage area 12a in the cover 12. That is, the camera 55 is disposed such that the light passage area 12a is located in the field of view represented as the area between the pair of chain lines 55a. The camera 55 is configured to output an image signal S51 corresponding to the acquired image. The acquisition of the image is repeated, for example, every second.

Figure 14A:
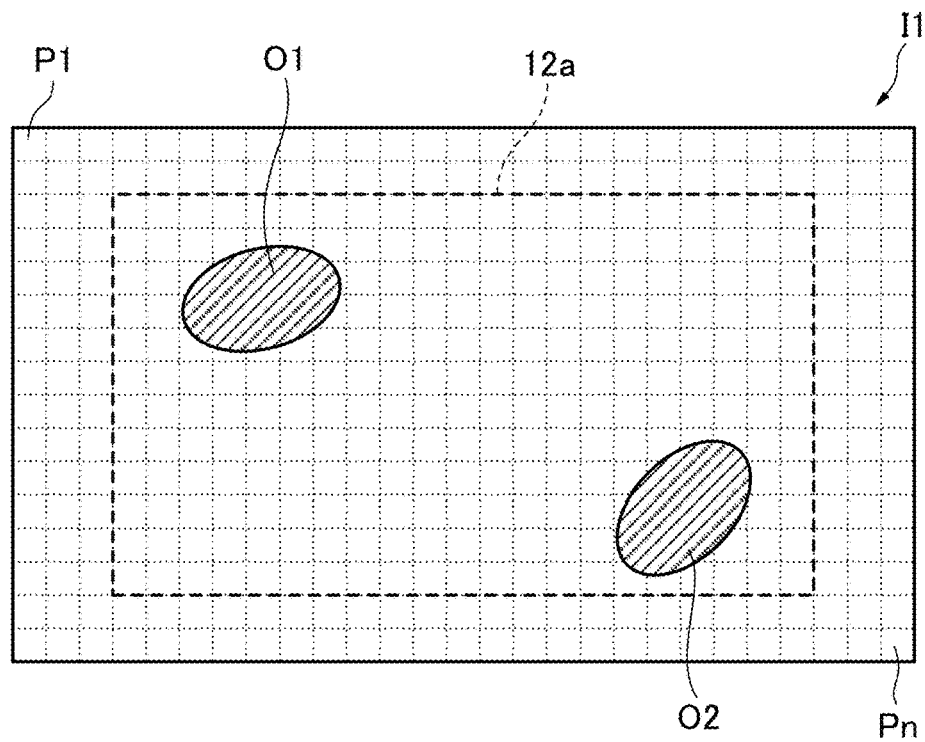
FIG. 14A illustrates an exemplary operation of a processor in the sensor system of FIG. 13.

FIG. 14A illustrates an example of an image I1 that can be reproduced based on the image signal S51. The image I1 includes a plurality of pixels P1 to Pn (n is an integer of 2 or more). The image I1 includes an image of the light passage area 12a in the cover 12. In this example, the foreign substances O1 and O2 adhere to the light passage area 12a. Examples of the foreign substance include raindrops, snow chips, sludge, and carcasses of insects.

As illustrated in FIG. 13, the sensor system 5 includes a control device 56. The control device 56 includes an input interface 561 and a processor 562. The control device 56 may be disposed in the accommodation chamber 13 or may be supported by the housing 11 outside the accommodation chamber 13. Alternatively, the control device 56 may be disposed at an appropriate position in the vehicle 100 distant from the housing 11.

The input interface 561 receives the image signal S51 outputted from the camera 55. The processor 562 is configured to detect a foreign substance adhering to the light passage area 12a of the cover 12 based on the image signal S51. As required, the input interface 561 may include a signal processing circuit that converts the image signal S51 into a form suitable for processing performed by the processor 562.

Referring to FIG. 4, a flow of processing performed by the processor 562 will be described. The processor 562 creates a data set D51 illustrated in FIG. 14B based on the image signal S51 (STEP1). Specifically, the processor 562 creates the data set D51 including the pixel data PD1 to PDn by applying the binarization processing to each of the pixels P1 to Pn. Accordingly, the plurality of pixel data PD1 to PDn correspond to the plurality of pixels P1 to Pn in the one-by-one manner.

Each of the pixels P1 to Pn includes locational information and brightness information (received light intensity information) in the image I1. When the brightness of a certain pixel Pm is greater than a prescribed threshold value, the processor 562 creates pixel data PDm having a brightness value of "1". m is an integer arbitrarily selected from 1 to n. When the brightness of a certain pixel Pm is no greater than the prescribed threshold value, the processor 562 creates pixel data PDm having a brightness value of "0". Accordingly, each of the pixel data PD1 to PDn has a brightness value of "1" or "0" in addition to the locational information in the image I1.

Figure 14B:
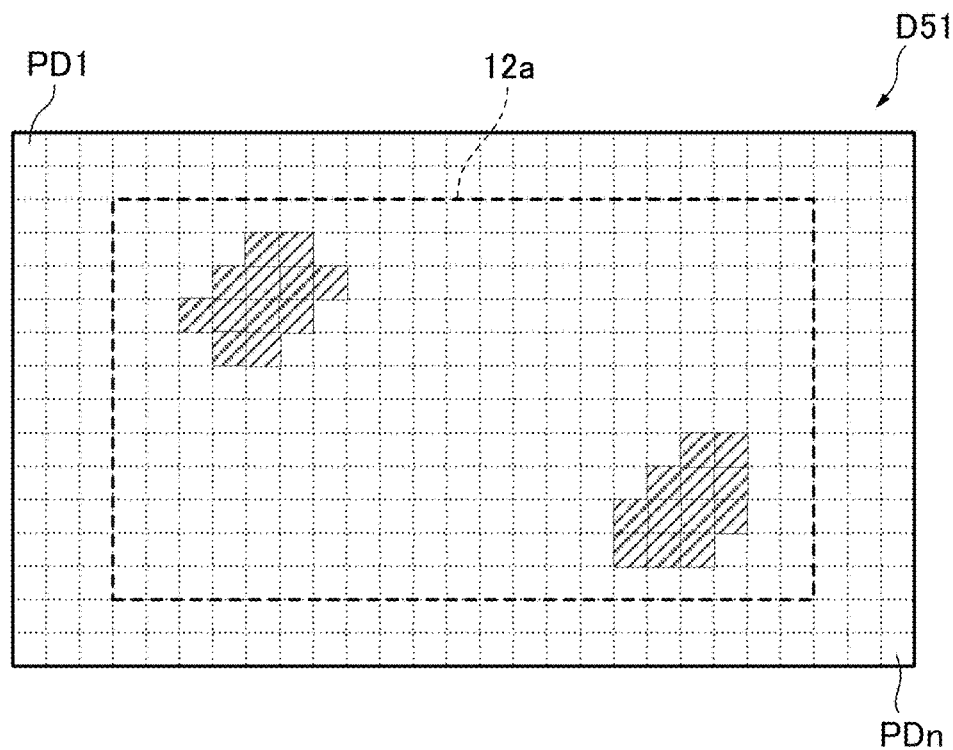
FIG. 14B illustrates another exemplary operation of the processor in the sensor system of FIG. 13.

In the example illustrated in FIG. 14B, the pixel data having the brightness value "1" is represented by a white rectangle, and the pixel data having the brightness value "0" is represented by a hatched rectangle. It is understood that the pixel data at the position corresponding to the foreign substance O1 or O2 in the image I1 has the brightness value "0".

As illustrated in FIG. 13, the control device 56 includes a storage 563. As illustrated in FIG. 4, the processor 562 determines whether or not the data set D51 created in the past based on the above technique is stored in the storage 563 (STEP2).

If the data set D51 created in the past is not stored in the storage 563 (N in STEP2), the processor 562 stores the data set D51 created in STEP in the storage 563 (STEP3). The processing returns to STEP1.

If the data set D51 created in the past is stored in the storage 563 (Y in STEP2), the processor 562 compares the data set D51 created in STEP1 with the data set D51 stored in the storage 563 (STEP4).

Specifically, it is determined whether or not the brightness value changes from "1" to "0" for each of the pixel data PD1 to PDn. When such a change occurs in a certain pixel data PDm, it is highly likely that a foreign substance is adhered to a position corresponding to the pixel data PDm. Based on the comparison, the processor 562 determines whether or not a foreign substance is adhered to the light passage area 12a of the cover 12 (STEP5).

If the brightness value has not changed from "1" to "0" in any of the pixel data PD1 to PDn, the processor 562 determines that no foreign substance adheres to the light passage area 12a of the cover 12 (N in STEP5). In this case, the data set D51 created in STEP1 is newly stored in the storage 563 (STEP3). Thereafter, the processing returns to STEP1. The data set D51 stored in the storage 563 is subjected to comparison with the data set D51 to be created next time.

If the brightness value changes from "1" to "0" in at least one of the plurality of pixel data PD1 to PDn, the processor 562 determines that a foreign substance is adhered to the light passage area 12a of the cover 12 (Y in STEP5). In this case, the processor 562 creates a detection signal S52 indicating the adhesion of the foreign substance (STEP6).

It should be noted that by configuring the processor 562 so as to determine that a foreign substance is adhered when the number of pixels whose brightness value is changed from "1" to "0" exceeds a prescribed threshold value, it is possible to avoid detecting a minute foreign substance that would not obstruct the information detection, and to enhance the detection accuracy of a foreign substance that needs to be removed.

As illustrated in FIG. 13, the control device 56 includes an output interface 564. The processor 562 causes the output interface 564 to output the detection signal S52. The detection signal S52 may be transmitted to another control device in the vehicle 100. For example, the other control device may notify the occupant of the vehicle 100 that a foreign substance is adhered to the light passage area 12a of the cover 12, based on the detection signal S52. Notifications may be made through at least one of a visual manner, an audible manner and a haptic manner.

The occupant who has received the notification can take an appropriate response. For example, the sensor system 5 may include a nozzle 17 that sprays liquid toward the cover 12. Examples of the liquid include water, hot water, and a cleaning liquid. The occupant may perform an operation of causing the nozzle 17 to spray liquid. As a result, it is possible to remove the foreign substance adhering to the light passage area 12a.

The camera 55 according to the present embodiment is not a device for acquiring an image of the outside area of the vehicle 100 (strictly speaking, an image of an area outer than the outer face of the cover 12), but is a device for acquiring an image of the light passage area 12a located on the traveling paths of the sensing light 14a of the LiDAR sensor unit 14 and the returned light. Accordingly, at least a portion of a focal plane 55b of the camera 55 overlaps the light passage area 12a. In addition, since it is prioritized to arrange the camera 55 such that at least a portion of the focal plane 55b overlaps the light passage area 12a, an optical axis 55c of the camera 55 may extend in a direction different from a reference sensing direction 14b of the LiDAR sensor unit 14, as illustrated in FIG. 13.

If a foreign substance adheres to the light passage area 12a located on the traveling paths of the sensing light 14a and the returned light of the LiDAR sensor unit 14, the LiDAR sensor unit 14 may be obstructed from detecting the information of the outside area of the vehicle 100. However, since the adhesion of such a foreign substance is detected by the camera 55 configured as described above, it is possible to perform appropriate treatment according to the detected result. Accordingly, it is possible to suppress degradation in the information detecting capability of the LiDAR sensor unit 14 covered by the cover 12 forming a part of the outer face of the vehicle 100.

The LiDAR sensor unit 14 may be replaced with an appropriate sensor unit that uses light to detect information of the outside area of the vehicle 100. Examples of such a sensor unit include a camera unit using visible light, a TOF (Time of Flight) camera unit using infrared light, and a radar unit using millimeter waves. However, since the detection of the foreign substance adhering to the light passage area 12a with the LiDAR sensor unit 14 is relatively difficult, the detection of the foreign substance through the acquisition of the image of the light passage area 12a with the camera 55 is more advantageous in combination with the LiDAR sensor unit 14.

As illustrated in FIG. 13, the detection signal S52 created by the processor 562 may be used to operate the nozzle 17 described above. That is, when a foreign substance adhering to the light passage area 12a of the cover 12 is detected, the processor 562 can cause the nozzle 17 to spray a liquid toward the light passage area 12a.

According to such a configuration, it is possible to automate the treatment for removing the foreign substance adhering to the light passage area 12a. Accordingly, it is possible to improve the effect of suppressing the degradation of the information detecting capability of the LiDAR sensor unit 14 covered by the cover 12 forming a part of the outer face of the vehicle 100.

As described above, each of the pixel data PD1 to PDn included in the data set D51 has information corresponding to the location in the light passage area 12a. Accordingly, the processor 562 can also specify the position of the foreign substance in the light passage area 12a based on the locational information held by the pixel data whose brightness value has changed from "1" to "0". On the other hand, as illustrated in FIG. 13, the nozzle 17 may include a mechanism capable of adjusting the spraying direction of the liquid. In this case, the processor 562 may configure the detection signal S52 so as to cause the nozzle 17 to spray the liquid toward the position of the detected foreign substance.

According to such a configuration, since the liquid is more accurately sprayed onto the foreign substance adhering to the light passage area 12a, it is possible to increase the possibility of removing the foreign substance. Accordingly, the degradation of the information detecting capability of the LiDAR sensor unit 14 covered by the cover 12 forming a part of the outer face of the vehicle 100 is further suppressed.

As illustrated in FIG. 13, the camera 55 may be realized as a micro camera module including an image pickup element 551, a resin lens 552, and a circuit board 553. Examples of the image pickup element 551 include a CCD image sensor and a CMOS image sensor. The resin lens 552 is a lens for forming an image on the image pickup element 551. From the viewpoint of enlarging the field of view, it is preferable to use a wide-angle lens as the resin lens 552. The circuit board 553 supports the image pickup element 551 and the resin lens 552. The signal line for outputting the image signal S51 is electrically connected to the image pickup element 551 via the circuit board 553.

According to such a configuration, since the space occupied by the camera 55 in the accommodation chamber 13 can be considerably reduced, it is possible to arrange the camera 55 for acquiring the image of the light passage area 12a with higher degree of freedom. Accordingly, it is possible to make easier to suppress degradation in the information detecting capability of the LiDAR sensor unit 14 covered by the cover 12 forming a part of the outer face of the vehicle 100.

As illustrated in FIG. 13, the sensor system 5 may include a lamp unit 18. Because of the function of supplying illumination light to the outside area of the vehicle 100, the lamp unit 18 is generally disposed in a place in the vehicle 100 where there are few obstructions. By disposing also the LiDAR sensor unit 14 in such a place, it is possible to efficiently obtain information of the outside area of the vehicle 100.

The processor 562 capable of performing the above-described processing may be provided by a general-purpose microprocessor operating in cooperation with a general-purpose memory, or may be provided as part of a dedicated integrated circuit device. Examples of the general-purpose microprocessor include a CPU, an MPU, and a GPU. Examples of the general-purpose memory include a RAM and a ROM. Examples of the dedicated integrated circuit element include a microcontroller, an ASIC, and an FPGA. The processor 562 and the storage 563 may be provided as separate devices or may be packaged in a single device.

Figure 15:
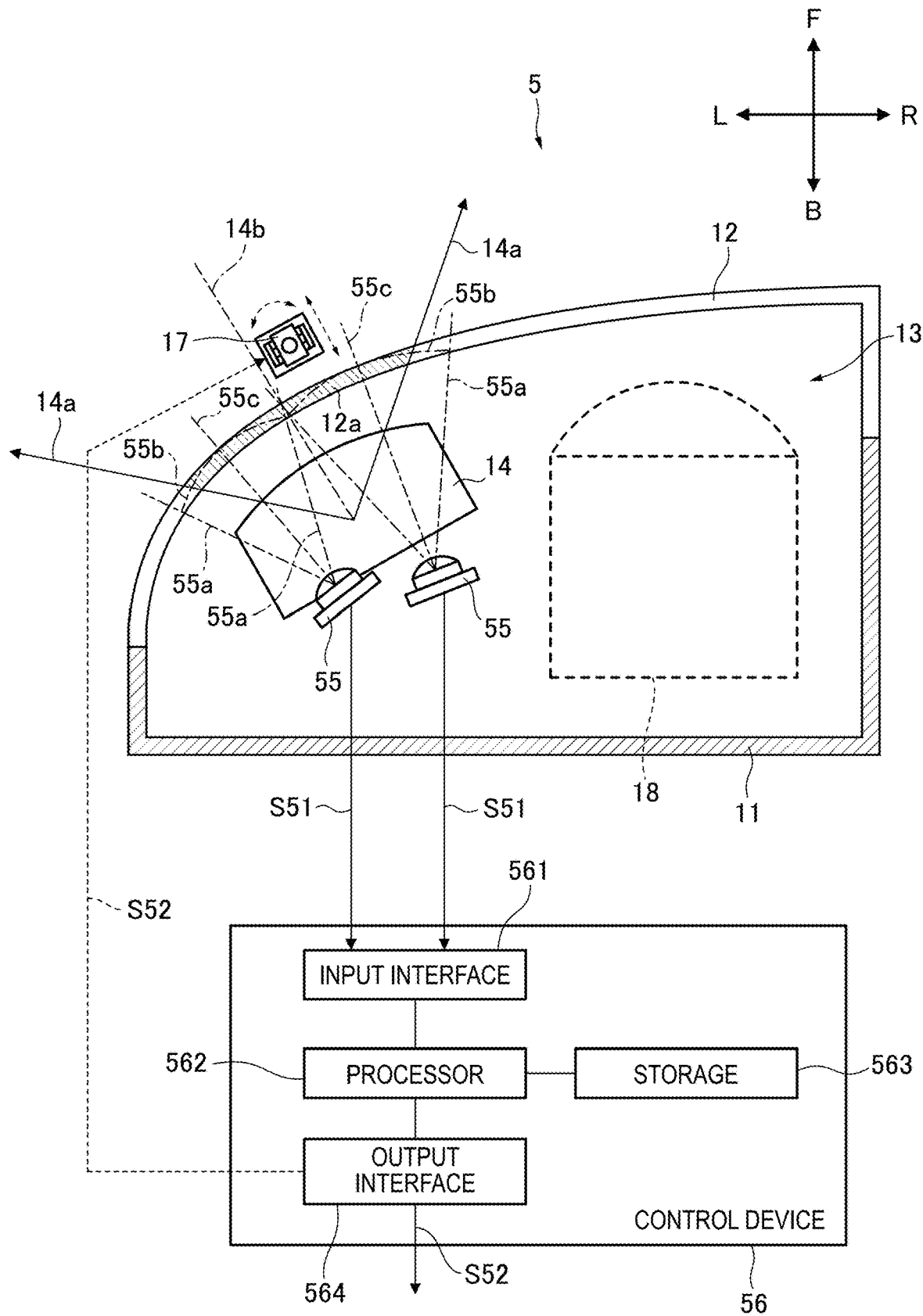
FIG. 15 illustrates another exemplary configuration of a sensor system according to the fifth embodiment.

In the present embodiment, an image of the light passage area 12a in the cover 12 is acquired by the single camera 55. However, as illustrated in FIG. 15, it is possible to employ a configuration in which an arbitrary portion in the light passage area 12a is included in any of the fields of view of a plurality of cameras 55.

The above embodiments are mere examples for facilitating understanding of the gist of the presently disclosed subject matter. The configuration according to each of the above embodiments can be appropriately modified, improved, or combined without departing from the gist of the presently disclosed subject matter.

In addition to or instead of the LiDAR sensor unit 14 according to each of the above embodiments, an appropriate sensor unit that uses light to detect information of an outside area of the vehicle 100 may be disposed in the accommodation chamber 13. Examples of such a sensor unit include a camera unit using visible light, a TOF (Time of Flight) camera unit using infrared light, and a radar unit using millimeter waves.

The present application is based on Japanese Patent Application No. 2018-213126 filed on Nov. 13, 2018, Japanese Patent Application No. 2018-213127 filed on Nov. 13, 2018, and Japanese Patent Application No. 2019-048514 filed on Mar. 15, 2019, the entire contents of which are incorporated herein by reference.

The invention claimed is:

1. A sensor system adapted to be installed in a vehicle, comprising:
   a sensor unit configured to detect information of an outside area of the vehicle with light;
   a cover covering the sensor unit so as to allow passage of the light through a light passage area while forming a part of an outer surface of the vehicle;
   a displacement sensor disposed on the cover and configured to output a signal corresponding to displacement of the cover; and
   a processor configured to detect a foreign substance adhered to the cover based on a change in the signal,
   wherein the displacement sensor is disposed on the cover and configured to output a signal corresponding to displacement of the cover comprises a plurality of displacement sensors disposed on the cover at locations other than the light passage area of the cover.

2. The sensor system according to claim 1, wherein the displacement sensor is a strain gage.

3. The sensor system according to claim 1, wherein the displacement sensor is an acceleration sensor.

4. The sensor system according to claim 3, further comprising:
   an actuator configured to vibrate the cover.

5. The sensor system according to claim 1, wherein the displacement sensor is an optical fiber sensor.

6. The sensor system according to claim 1, wherein the displacement sensor is disposed in an peripheral portion of the cover.

7. The sensor system according to claim 1, further comprising:
   a nozzle configured to spray liquid,
   wherein the processor is configured to cause the nozzle to spray the liquid toward the cover in a case where adhesion of the foreign substance is detected.

8. The sensor system according to claim 1, further comprising:
   a nozzle configured to spray liquid,
   wherein the processor is configured to specify a position on the cover to which the foreign substance adheres, and to cause the nozzle to spray the liquid toward the position.

9. The sensor system according to claim 1, further comprising:
   a lamp unit configured to emit illumination light to the outside area of the vehicle,
   wherein the cover is configured to allow passage of the illumination light.

10. The sensor system according to claim 1, wherein the displacement sensor is configured to output a signal corresponding to a change in distribution of strain of the cover.

11. A sensor system adapted to be installed in a vehicle, comprising:
    a sensor unit configured to detect information of an outside area of the vehicle with light;
    a cover covering the sensor unit so as to allow passage of the light while forming a part of an outer surface of the vehicle;
    a displacement sensor disposed on the cover and configured to output a signal corresponding to displacement of the cover; and
    a processor configured to detect a foreign substance adhered to the cover based on a change in the signal,
    wherein the displacement sensor is disposed in a portion where a thickness of the cover changes.

* * * * *